United States Patent
Jung et al.

(10) Patent No.: US 9,237,296 B2
(45) Date of Patent: Jan. 12, 2016

(54) IMAGE DISPLAY APPARATUS AND OPERATING METHOD THEREOF

(75) Inventors: Dae Young Jung, Seoul (KR); Hae Jin Bae, Seoul (KR); Jae Kyung Lee, Seoul (KR); Kun Sik Lee, Seoul (KR); Gyu Seung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 226 days.

(21) Appl. No.: 12/630,471

(22) Filed: Dec. 3, 2009

(65) Prior Publication Data

US 2010/0306800 A1    Dec. 2, 2010

(30) Foreign Application Priority Data

Jun. 1, 2009  (KR) ........................ 10-2009-0048229
Jun. 3, 2009  (KR) ........................ 10-2009-0049193

(51) Int. Cl.
*H04N 7/173*    (2011.01)
*H04N 5/445*    (2011.01)
*H04N 1/00*     (2006.01)
(Continued)

(52) U.S. Cl.
CPC ....... *H04N 5/44543* (2013.01); *H04N 1/00448* (2013.01); *H04N 1/00453* (2013.01); *H04N 1/00461* (2013.01); *H04N 5/44582* (2013.01); *H04N 5/44591* (2013.01); *H04N 21/4263* (2013.01); *H04N 21/4314* (2013.01); *H04N 21/4316* (2013.01); *H04N 21/440263* (2013.01); *H04N 21/4622* (2013.01); *H04N 21/4755* (2013.01); *H04N 21/482* (2013.01); *H04N 21/84* (2013.01)

(58) Field of Classification Search
CPC .............. H04N 5/4453; H04N 5/4456; H04N 5/44565; H04N 5/44543; H04N 5/44556; H04N 5/44582; H04N 5/44591; H04N 21/482; H04N 21/4821; H04N 21/4823; H04N 21/4316; H04N 21/4622; H04N 21/4263; H04N 21/4312; H04N 21/4314; H04N 21/4318; H04N 21/44016; H04N 21/440263; H04N 21/4886
USPC ................. 715/838, 835, 712; 725/56, 38, 44
See application file for complete search history.

(56) References Cited

U.S. PATENT DOCUMENTS 5,801,785 A * 9/1998 Crump et al. ................. 348/563
5,818,439 A * 10/1998 Nagasaka et al. ............... 725/87
(Continued)

FOREIGN PATENT DOCUMENTS

EP    1 511 304    3/2005
EP    1 758 383    2/2007
(Continued)

OTHER PUBLICATIONS

European Search Report dated Jul. 21, 2010 cited in corresponding European Application for U.S. Appl. No. 12/630,609, filed Dec. 3, 2009.
(Continued)

*Primary Examiner* — Pankaj Kumar
*Assistant Examiner* — Reuben M Brown
(74) *Attorney, Agent, or Firm* — Ked & Associates, LLP

(57) ABSTRACT

A method for operating an image display apparatus includes providing input signals to the image display apparatus, displaying at least one image on a display based on the input signals, generating a plurality thumbnail images based on the input signals, and displaying a thumbnail-image list which includes a plurality of generated thumbnail images.

13 Claims, 21 Drawing Sheets

(51) Int. Cl.
*H04N 21/462* (2011.01)
*H04N 21/482* (2011.01)
*H04N 21/426* (2011.01)
*H04N 21/431* (2011.01)
*H04N 21/4402* (2011.01)
*H04N 21/475* (2011.01)
*H04N 21/84* (2011.01)
*H04N 7/16* (2011.01)

(56) References Cited

U.S. PATENT DOCUMENTS

| | | | |
|---|---|---|---|
| 5,900,868 A | 5/1999 | Duhault | |
| 6,118,493 A | 9/2000 | Duhault et al. | |
| 6,483,983 B1* | 11/2002 | Takahashi et al. | 386/230 |
| 7,757,252 B1* | 7/2010 | Agasse | 725/41 |
| 7,860,742 B1* | 12/2010 | Gonzalez-Rivas | 705/14.4 |
| 8,103,969 B2* | 1/2012 | Gupta et al. | 715/825 |
| 8,132,208 B2* | 3/2012 | Gonzalez | 725/46 |
| 8,732,600 B2* | 5/2014 | Robert et al. | 715/767 |
| 8,799,954 B1* | 8/2014 | Ellis | H04N 5/44543 725/46 |
| 8,869,200 B2* | 10/2014 | Sullivan et al. | 725/38 |
| 2002/0166122 A1 | 11/2002 | Kikinis et al. | |
| 2003/0229894 A1 | 12/2003 | Okada et al. | |
| 2004/0022313 A1 | 2/2004 | Kim | |
| 2004/0128317 A1 | 7/2004 | Sull et al. | |
| 2005/0228806 A1 | 10/2005 | Haberman | |
| 2005/0235312 A1 | 10/2005 | Karaoguz et al. | |
| 2006/0150215 A1 | 7/2006 | Wroblewski | |
| 2007/0083911 A1* | 4/2007 | Madden et al. | 725/135 |
| 2007/0136750 A1 | 6/2007 | Abanami et al. | |
| 2007/0204238 A1 | 8/2007 | Hua et al. | |
| 2007/0204297 A1 | 8/2007 | Gonzalez | |
| 2007/0250896 A1 | 10/2007 | Parker et al. | |
| 2008/0072252 A1 | 3/2008 | Morris et al. | |
| 2008/0127258 A1 | 5/2008 | Walker et al. | |
| 2008/0134237 A1 | 6/2008 | Tu et al. | |
| 2009/0019479 A1 | 1/2009 | Kwak et al. | |
| 2009/0043737 A1* | 2/2009 | Faris et al. | 707/3 |
| 2009/0064222 A1 | 3/2009 | Dawson et al. | |
| 2009/0083824 A1 | 3/2009 | McCarthy et al. | |
| 2010/0306800 A1* | 12/2010 | Jung et al. | 725/41 |
| 2010/0306801 A1* | 12/2010 | Filippov et al. | 725/44 |
| 2014/0208356 A1* | 7/2014 | McCarthy et al. | 725/41 |

FOREIGN PATENT DOCUMENTS

| | | |
|---|---|---|
| EP | 1 971 142 | 9/2008 |
| JP | 2004-096688 | 3/2004 |
| KR | 10-2001-0053591 | 6/2001 |
| KR | 10-2005-0073011 A | 7/2005 |
| KR | 10-2006-0015075 | 2/2006 |
| KR | 10-2006-0031957 A | 4/2006 |
| KR | 10-2006-0094401 A | 8/2006 |
| KR | WO 2007/105876 | 9/2007 |
| KR | WO 2008/038881 | 4/2008 |
| WO | WO 01/06381 | 1/2001 |
| WO | WO 01/71719 | 9/2001 |

OTHER PUBLICATIONS

European Search Report dated Sep. 23, 2010.
European Search Report dated Sep. 30, 2010.
US Office Action for U.S. Appl. No. 12/630,609 dated May 23, 2012.
US Office Action for U.S. Appl. No. 12/630,609 dated Jan. 18, 2012.
U.S. Office Action issued in U.S. Appl. No. 12/630,609 dated Feb. 20, 2013.
US Office Action for U.S. Appl. No. 12/630,567 dated Jul. 9, 2012.
Korean Office Action issued in related Application No. 10-2009-0049193 dated Apr. 18, 2015.
US Office Action for U.S. Appl. No. 12/630,567 dated Mar. 9, 2012.
Chinese Office Action issued in CN Application No. 201010194012.4 dated Mar. 1, 2013.

* cited by examiner

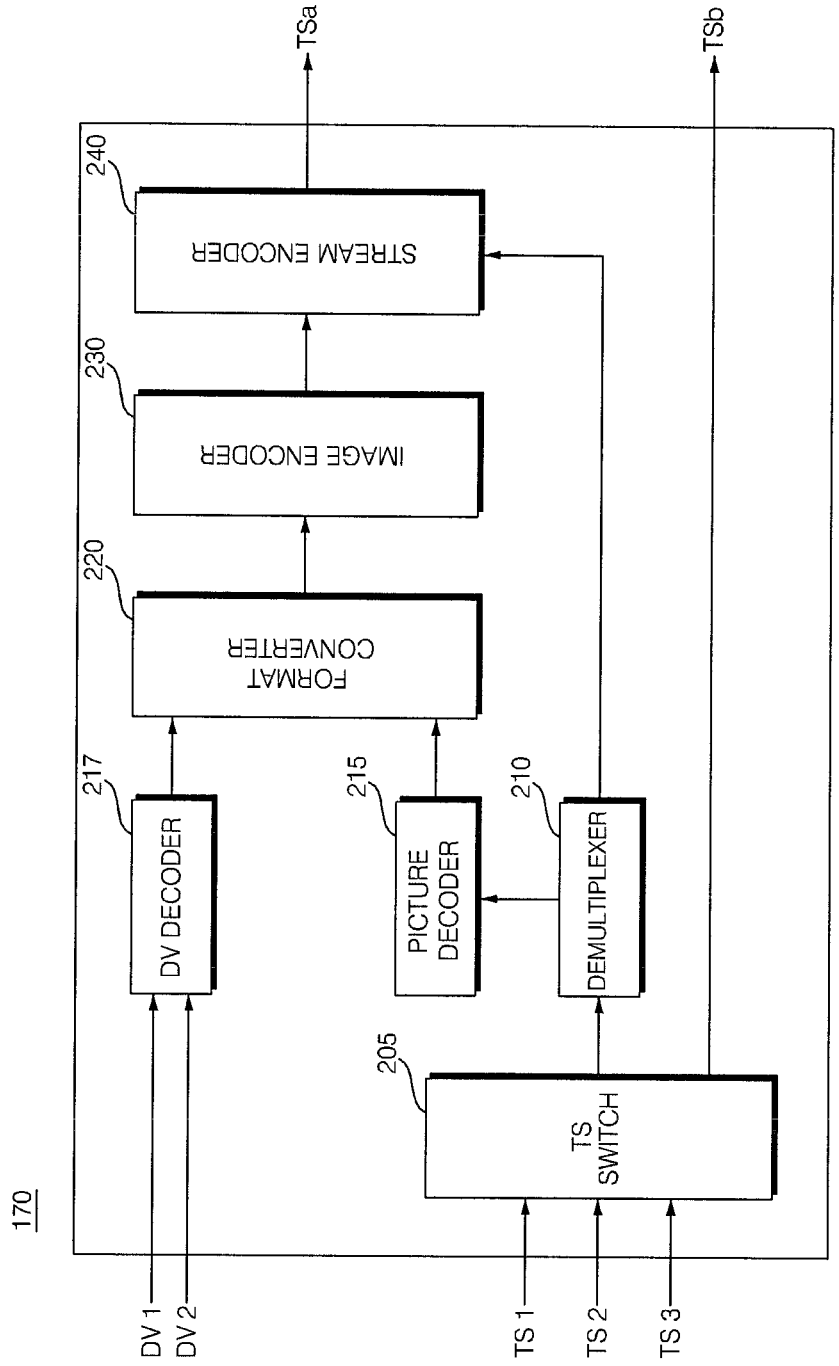

IMAGE DISPLAY APPARATUS AND OPERATING METHOD THEREOF

CROSS-REFERENCE TO RELATED APPLICATION

This application claims the priority benefit of Korean Patent Application No. 10-2009-0048229, filed on Jun. 1, 2009, and 10-2009-0049193, filed on Jun. 3, 2009 in the Korean Intellectual Property Office, the disclosure of which is incorporated herein by reference.

BACKGROUND

1. Field

One or more embodiments described herein relate to displaying images.

2. Background

Digital broadcasting offer many advantages over analog broadcasting such as robustness against noise, no or little data loss, ease of error correction, and the ability to provide for high-definition viewing. Digital broadcasting also has allowed interactive services to be offered to customers. However, as the number of channels increase, it is becoming more difficult for viewers to determine what programs they are watching as they switch through channels. It is also difficult for users to identify the source of video signals input to their image display apparatuses especially when peripherals are connected.

BRIEF DESCRIPTION OF THE DRAWINGS

FIG. 2 is a diagram of a channel-browsing processor shown in FIG. 1.

DETAILED DESCRIPTION

Figure 1:
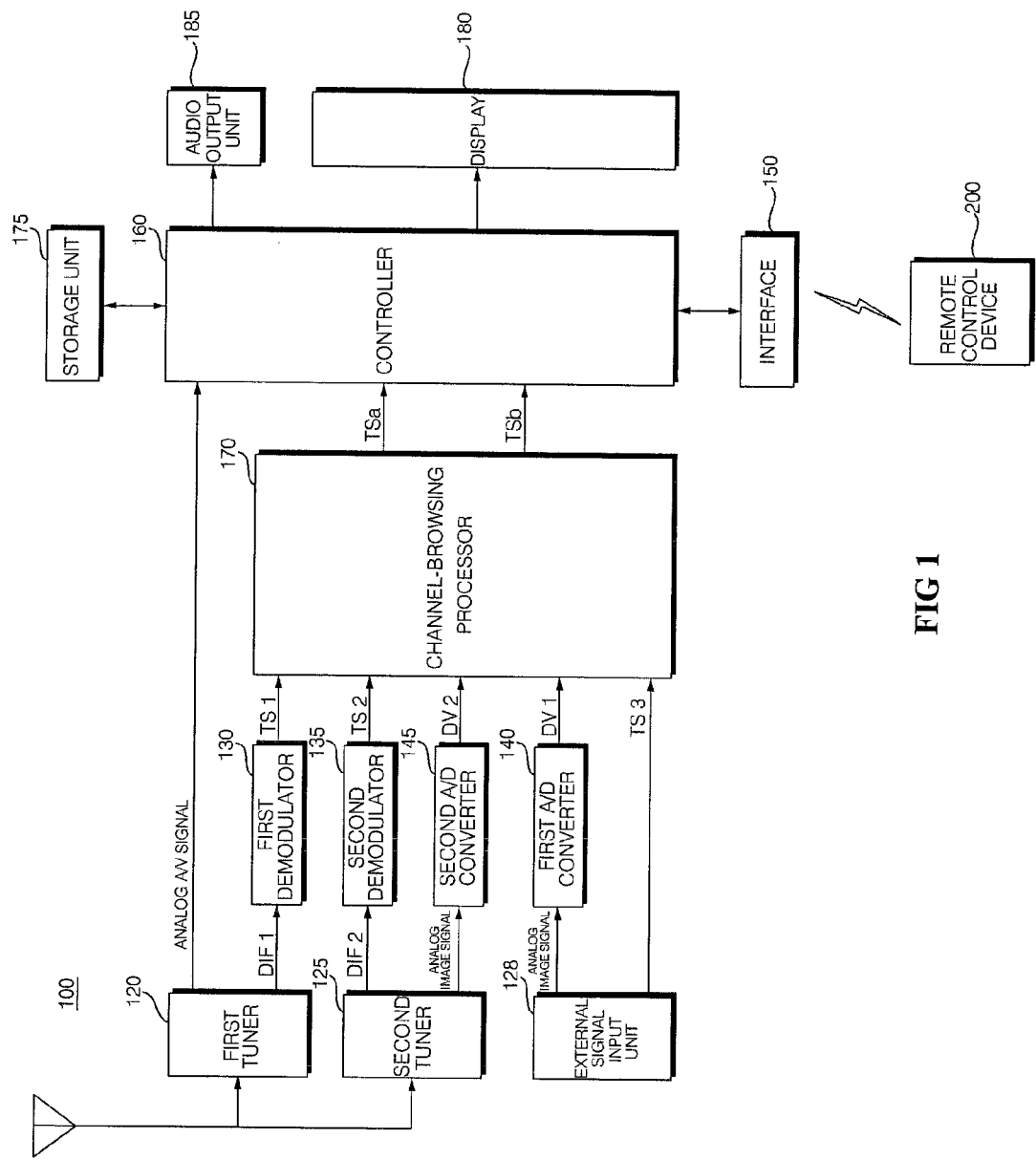
FIG. 1 is a diagram of one embodiment of an image display apparatus.

FIG. 1 shows one embodiment of an image display apparatus 100, which includes a first tuner 120, a second tuner 125, an external signal input unit 128, a first demodulator 130, a second demodulator 135, a first analog-to-digital (A/D) converter 140, a second A/D converter 145, an interface 150, a controller 160, a channel-browsing processor 170, a storage unit 175, a display 180, and an audio output unit 185.

The first tuner 120 may choose a radio frequency (RF) broadcast signal corresponding to a channel chosen by a user from a plurality of RF broadcast signals received via an antenna or other signal source, and may convert the chosen RF broadcast signal into a digital intermediate-frequency (IF) signal or an analog baseband A/V signal.

More specifically, if the chosen RF broadcast signal is a digital broadcast signal, the first tuner 120 may convert the chosen RF broadcast signal into a first digital IF signal DIF 1. On the other hand, if the chosen RF broadcast signal is an analog broadcast signal, the first tuner may convert the chosen RF broadcast signal into an analog baseband A/V signal CVBS 1/SIF. That is, the first tuner may be a hybrid tuner capable of processing not only digital broadcast signals but also analog broadcast signals.

The analog baseband A/V signal CVBS1/SIF may be directly input to controller 160. Also, the first tuner 120 may be able to receive RF broadcast signals from an Advanced Television Systems Committee (ATSC) single-carrier system or from a Digital Video Broadcasting (DVB) multi-carrier system.

The second tuner 125, like the first tuner, may choose the RF broadcast signal corresponding to a channel chosen from all the plurality of RF signals received through the antenna, and may convert the chosen RF broadcast signal into a second digital IF signal DIF 2 or an analog baseband A/V signal CVBS 2/SIF.

In addition, the second tuner may sequentially or periodically choose a number of RF broadcast signals respectively corresponding to a number of channels previously added to the image display apparatus 100 by a channel-add function from a plurality of RF signals received through the antenna, and may convert the chosen RF broadcast signals into IF signals or baseband A/V signals. In one exemplary embodiment, one or more video frames acquired from each of the previously-added channels may be displayed on the display 180 as thumbnail images. Thus, it is possible to receive the RF broadcast signals that respectively correspond to the previously-added channels sequentially or periodically.

For example, the first tuner 120 may convert a main RF broadcast signal chosen by the user into an IF signal or a baseband A/V signal, and the second tuner 125 may sequentially or periodically choose all other RF broadcast signals (i.e., sub-RF broadcast signals) and may convert the chosen RE broadcast signals into IF signals or baseband A/V signals.

The first demodulator 130 may receive the first digital IF signal DIF 1 from the first tuner 120 and may demodulate the first digital IF signal DIF 1. If the first digital IF signal DIF 1 is an ATSC signal, the first demodulator 130 may perform 8-vestigal sideband (VSB) demodulation on the first digital IF signal DIF 1. In addition, the first demodulator may perform channel decoding using, for example, a Trellis decoder (not shown), a de-interleaver (not shown) and a Reed-Solomon decoder (not shown) and may thus be able to perform Trellis decoding, de-interleaving and Reed-Solomon decoding.

For example, if the first digital IF signal DIF 1 is a DVB signal, the first demodulator 130 may perform coded orthogonal frequency division modulation (COFDMA) demodulation on the first digital IF signal DIF 1. Also, the first demodulator 130 may perform channel decoding using, for example, a convolution decoder (not shown), a de-interleaver (not shown), and a Reed-Solomon decoder (not shown) and may thus be able to perform convolution decoding, de-interleaving and Reed-Solomon decoding.

The external signal input unit 128 may receive signals from an external device. For this, the external signal input unit may include an A/V input/output (I/O) module (not shown) and a wireless communication module (not shown).

The external signal input unit 128 may be connected to an external device such as a digital versatile disc (DVD), a Blu-ray disc, a gaming device, a camcorder, or a computer (e.g., a laptop computer). Based on these connections, the external signal input unit may receive various external input image, audio and data signals from the external device and may transmit the received external input signals to controller 160. In addition, the external signal input unit may output various video, audio and data signals processed by controller 160 to the external device.

In order to receive A/V signals from or transmit A/V signals to an external device, the A/V I/O module of the external signal input unit 128 may include an Ethernet port, a universal serial bus (USB) port, a composite video banking sync (CVBS) port, a component port, a super-video (S-video) (analog) port, a digital visual interface (DVI) port, a high-definition multimedia interface (HDMI) port, a red-green-blue (RGB) port, a D-sub port, an Institute of Electrical and Electronics Engineers (IEEE)-1394 port, a Sony/Philips Digital Interconnect Format (S/PDIF) port, and a liquidHD port.

Analog signals received through the CVBS port and the S-video port may be converted into digital signals by the first A/D converter 140. Digital signals received through the Ethernet port, the USB port, the component port, the DVI port, the HDMI port, the RGB port, the D-sub port, the IEEE-1394 port, the S/PDIF port and the liquidHD port may be directly input to the channel-browsing processor 170 without the need to be digitized.

The wireless communication module may wirelessly access the internet. For this, the wireless communication module may use a wireless local area network (WLAN) (i.e., Wi-Fi), Wireless broadband (Wibro), World Interoperability for Microwave Access (Wimax), and High Speed Downlink Packet Access (HSDPA).

In addition, the wireless communication module may perform short-range wireless communication with other electronic devices. For this, the wireless communication module may use Bluetooth, radio-frequency identification (RFID), Infrared Data Association (IrDA), Ultra Wideband (UWB), and ZigBee.

The external signal input unit 128 may be connected to various set-top boxes through at least one of the Ethernet port, the USB port, the CVBS port, the component port, the S-video port, the DVI port, the HDMI port, the RGB port, the D-sub port, the IEEE-1394 port, the S/PDIF port, and the liquidHD port and may thus receive data from or transmit data to the various set-top boxes. For example, when connected to an Internet Protocol Television (IPTV) set-top box, the external signal input unit 128 may transmit video, audio and data signals processed by the IPTV set-top box to the controller 160 and may transmit various signals provided the controller 160 to the IPTV set-top box.

Alternatively, a video signal, an audio signal and/or a data signal processed by an IPTV set-top box may be processed by the channel-browsing processor 170 and then the controller 160.

The term 'IPTV', as used herein, may cover a broad range of services such as ADSL-TV, VDSL-TV, FTTH-TV, TV over DSL, Video over DSL, TV over IP (TVIP), Broadband TV (BTV), and Internet TV and full-browsing TV, which are capable of providing Internet-access services.

A digital signal output by the external signal input unit 128 (e.g., a third stream signal TS3) may be input to the channel-browsing processor 170 and may thus be processed by the channel-browsing processor 170. The third stream signal TS3 may be a signal obtained by multiplexing a video signal, an audio signal, and a data signal. For example, the third stream signal TS 3 may be an MPEG-2 transport stream (TS) signal obtained by multiplexing an MPEG-2 video signal and a Dolby AC-3 audio signal.

An analog baseband video signal CVBS 1 output by the external signal input unit 128 may need to be digitized by the first A/D converter 140.

The first A/D converter 140 may convert an analog signal input thereto into a digital signal. If the input analog signal is a video signal, the first A/D converter 140 may perform sampling and quantization on the input analog signal, thereby obtaining a first digital video signal DV 1. The first digital video signal DV 1 may be a signal yet to be encoded. The first digital video signal DV 1 may be input into channel-browsing processor 170 and may thus be processed by the channel-browsing processor 170. The operation of the channel-browsing processor 170 will be described later in detail.

The first demodulator 130 may perform demodulation and channel decoding on the first digital IF signal DIF 1 provided by the first tuner 120, thereby obtaining a first stream signal TS 1. The first stream signal TS 1 may be a signal obtained by multiplexing a video signal, an audio signal, and a data signal. For example, the first stream signal TS 1 may be an MPEG-2 TS signal obtained by multiplexing an MPEG-2 video signal and a Dolby AC-3 audio signal. An MPEG-2 TS signal may include a 4-byte header and a 183-byte payload.

The first stream signal TS 1 may be input to controller 160 and be subjected to demultiplexing and signal processing. In one exemplary embodiment, first stream signal TS 1 may be input to channel-browsing processor 170 and be subject to processes for channel-browsing before input to controller 160. A channel-browsing operation will be described in greater detail below.

In order to properly handle not only ATSC signals but also DVB signals, the first demodulator 130 may include an ATSC demodulator and a DVB demodulator.

The second demodulator 135 may receive the second digital IF signal DIF 2 from the second tuner 125 and may demodulate the second digital IF signal DIF 2, thereby generating a second stream signal TS 2. Operation of the second demodulator 135 may be similar to operation of first demodulator 135.

An analog baseband video signal CVBS 2 output by the second tuner 125 may be digitized by the second A/D converter 145. The second A/D converter may convert an analog signal into a digital signal. If the input analog signal is a video signal, the second A/D converter may perform sampling and quantization on the input analog signal, thereby obtaining a second digital video signal DV 2. The second digital video signal DV 2 may be a signal yet to be encoded. The second digital video signal DV 2 may be input to channel-browsing processor 170 for processing.

The interface 150 may transmit signals provided by a user to controller 160 or transmits signals provided by controller 160 to the user. For example, the interface may receive various user input signals such as a power-on/off signal, a channel-selection signal, and a channel-setting signal from a remote control device 200 or may transmit a signal provided by controller 160 to the remote control device.

The controller 160 may demultiplex an input stream into a number of signals and may process the signals obtained by the demultiplexing so that the processed signals can be output as A/V data. The controller may control the general operation of the image display apparatus 100.

The controller may include a demultiplexer (not shown), a video processor (not shown), an audio processor (not shown), and a user input processor (not shown). The controller may demultiplex an input stream signal (e.g., an MPEG-2 TS signal) into a video signal, an audio signal, and/or a data signal. Thereafter, controller 160 may process the video signal. For example, if the video signal is an encoded signal, the controller may decode the video signal. More specifically, if the video signal is an MPEG-2 encoded signal, the controller may decode the video signal by performing MPEG-2 decoding. On the other hand, if the video signal is an H.264-encoded DMB or DVB-handheld (DVB-H) signal, the controller may decode the video signal by performing H.264 decoding. The controller may also adjust the brightness, tint, and/or color of the video signal.

The video signal processed by controller 160 may be input to display 180. Alternatively, the video signal processed by the controller may be input to an external output port which is connected to an external output device.

The controller 160 may process the audio signal obtained by demultiplexing the input stream signal. For example, if the audio signal is an encoded signal, the controller may decode the audio signal. More specifically, if the audio signal is an MPEG-2 encoded signal, the controller may decode the audio signal by performing MPEG-2 decoding. On the other hand, if the audio signal is an MPEG-4 Bit Sliced Arithmetic Coding (BSAC)-encoded terrestrial DMB signal, the controller may decode the audio signal by performing MPEG-4 decoding. On the other hand, if the audio signal is an MPEG-2 Advanced Audio Coding (AAC)-encoded DMB or DVB-H signal, the controller may decode the audio signal by performing AAC decoding. The controller may also adjust the base, treble, and/or sound volume of the audio signal.

The audio signal processed by controller 160 may be input into audio output unit 185, e.g., a speaker, and may thus be output by the audio output unit. Alternatively, the audio signal processed by controller 160 may be input to an external output port which is connected to an external output device.

The controller 160 may process the data signal obtained by demultiplexing the input stream signal. For example, if the data signal is an encoded signal such as an electronic program guide (EPG), which is a guide to scheduled broadcast TV or radio programs, the controller 160 may decode the data signal. Examples of an EPG include ATSC-Program and System Information Protocol (PSIP) information and DVB-Service Information (SI). ATSC-PSIP information or DVB-SI information may be included in the header of a TS, i.e., a 4-byte header of an MPEG-2 TS.

The controller 160 may perform on-screen display (OSD) processing. More specifically, the controller may generate an OSD signal for displaying various information on display device 180 as graphic or text data based on a user input signal provided by the remote control device 200 and at least one of a processed video signal and a processed data signal. The OSD signal may be input to display 180 along with the processed video signal and the processed data signal. The OSD signal may include various data such as a user-interface (UI) screen for the image display apparatus 100 and various menu screens, widgets, and icons.

The channel-browsing processor 170 may perform channel browsing on a plurality of broadcast signals that respectively correspond to a plurality of received channels, various input image signals input thereto from external signal input unit 128, or both. More specifically, the channel-browsing processor may receive the first or second stream signal TS 1 or TS 2 from the first or second demodulator 130 or 135, the third stream signal TS 3 from the external signal input unit 128, or the digital signal DV 1 or DV 2 from the first or second A/D converter 140 or 145, demultiplex the first, second or third stream signal TS 1, TS 2 or TS 3, and extract some of the frames of a video signal obtained by the demultiplexing.

Thereafter, the channel-browsing processor may generate a new TS signal, i.e., a sub-stream signal TSa, by multiplexing a video signal including the extracted video frames. For example, the sub-stream signal TSa and a main-stream signal TSb may both be MPEG-2 TS signals. The channel-browsing processor may output the main-stream signal TSb, which corresponds to a main video signal to be displayed in a main region on the display, as is without any modifications. On the other hand, the channel-browsing processor may perform channel browsing on a sub-image signal, which is to be displayed in a sub-region on the display, thereby obtaining the sub-stream signal TSa.

In this exemplary embodiment, the channel-browsing processor may extract some of the video frames of each of a plurality of broadcast signals received from a plurality of channels and may re-encode the extracted video frames into a TS, thereby displaying a list of the channels on the display. Since the extracted video frames are displayed on the display as thumbnail images, the user may intuitively identify the content of broadcast programs received from the plurality of channels.

Likewise, channel-browsing processor 170 may extract some of the video frames of each of various external input signals provided by the external signal input unit 128 and may re-encode the extracted video frames into a stream, thereby displaying an external input image list on the display. In this manner, a list of a plurality of external input image signals provided by various external input devices may be displayed on the display as thumbnail images. Therefore, the user may intuitively identify the external input signals provided by the various external input devices based on the external input image list. The structure and operation of the channel-browsing processor will be described in greater detail below.

The storage unit 175 may store various programs for processing and controlling various signals, and may also store processed video, audio and data signals.

The storage unit 175 may temporarily store a video, audio, and/or data signal provided by the external signal input unit 128. The storage unit may also store various broadcast channels using a channel-add function. The storage unit may include at least one of a flash memory-type storage medium, a hard disc-type storage medium, a multimedia card micro-type storage medium, a card-type memory, a random access memory (RAM) and a read-only memory (ROM) such as an electrically erasable programmable ROM (EEPROM).

Storage unit 175 is shown in FIG. 1 as being separate from controller 160. However, the storage unit may be incorporated into the controller in alternative embodiments.

The image display apparatus 100 may play a file (e.g., a moving-image file, a still-image file, or a document file) stored in storage unit 175 for a user.

The display 180 may convert a processed video signal, a processed data signal, and an OSD signal provided by controller 160 or a video signal and a data signal provided by external signal input unit 128 into RGB signals, thereby generating driving signals. The display may be implemented into various types of displays such as a plasma display panel, a liquid crystal display (LCD), an organic light-emitting diode (OLED), a flexible display, and a three-dimensional (3D)

display. The display may also be implemented as a touch screen and may thus be used not only as an output device but also as an input device.

The audio output unit 185 may receive a processed audio signal (e.g., a stereo signal or a 5.1-channel signal) from controller 160 and may output the received audio signal. The audio output unit may be implemented into various types of speakers.

The remote control device 200 may transmit user input to the interface 150. For this, the remote control device may use various communication techniques such as Bluetooth, RF, IR, UWB and ZigBee. In addition, the remote control device may receive a video signal, an audio signal, and/or a data signal from interface 150 and may output the received signals. In addition, the remote control device may be a spatial remote control, an example of which is described in greater detail below with reference to FIG. 3.

The image display apparatus 100 is shown in FIG. 1 as being equipped with two tuners. However, in alternative embodiments, the image display apparatus may include only one tuner. In this case, the image display apparatus may receive a broadcast signal from a channel chosen by the user with the use of the tuner. Then, if a 'channel list' menu is selected, the image display apparatus may sequentially or periodically receive broadcast signals from all broadcast channels stored in advance with the use of a channel-add function. Then, a list of the previously-added channels may be displayed in a full-view mode in response to a command to display a channel list in full view.

The image display apparatus 100 may be a fixed digital broadcast receiver capable of receiving at least one of ATSC (8-VSB) broadcast programs, DVB-T (COFDM) broadcast programs, and ISDB-T (BST-OFDM) broadcast programs or may be a mobile digital broadcast receiver capable of receiving at least one of terrestrial DMB broadcast programs, satellite DMB broadcast programs, ATSC-M/H broadcast programs, DVB-H (COFDM) broadcast programs, and Media Forward Link Only (MediaFLO) broadcast programs. Alternatively, the image display apparatus may be a digital broadcast receiver capable of receiving cable broadcast programs, satellite broadcast programs or IPTV programs.

Examples of the image display apparatus include a TV receiver, a mobile phone, a smart phone, a laptop computer, a digital broadcast receiver, a personal digital assistant (PDA) and a portable multimedia player (PMP).

FIG. 2 shows one example of channel-browsing processor 170 shown in FIG. 1. In this example, the channel-browsing processor includes a TS switch 205, a demultiplexer 210, a picture decoder 215, a DV decoder 217, a format converter 220, a video encoder 230 and a stream encoder 240.

The TS switch 205 may choose one of the first, second or third stream signals TS 1, TS 2 and TS 3, output the chosen stream signal as a main-stream signal TSb without any modifications, and transmit the other two stream signals to the demultiplexer 210 as sub-stream signals. The main-stream signal, which corresponds to a main-video signal, may be displayed on the entire display 180. The sub-stream signals, which correspond to sub-image signals, may be displayed only on a certain part of the display. In this manner, a channel list, an external input image list, or both, may be displayed in a compact view in a certain area of the display.

The demultiplexer 210 may demultiplex the first, second, or third stream signal TS 1, TS 2 or TS 3 into a video signal, an audio signal, and/or a data signal, transmit the video signal to a picture decoder 215, and transmit the audio signal and data signal to a stream encoder 240 in order to allow the stream encoder to generate a new stream signal.

The picture decoder 215 may receive the video signal obtained by the demultiplexing performed by demultiplexer 210 and may decode at least some of the frames of the received video signal by performing MPEG-2 decoding, MPEG-4 decoding or H.264 decoding. The decoded frames may be still images or moving images. For example, the picture decoder may decode an intra-coded (I) frame or some section of the received video signal.

The DV decoder 217 may receive the first and second digital signals DV 1 and DV 2 from the first and second A/D converters 140 and 145, respectively, and may acquire a digital image signal.

The format converter 220 may convert the format of a video signal input thereto from picture decoder 215 or DV decoder 217. For example, the format converter may change a size (or resolution) of the input image signal and may thus enable the input image signal to be displayed on the display as a thumbnail image with an appropriate size.

In addition, the format converter may convert the input image signal into different sizes according to whether the input image signal is to be displayed in compact-view mode or full-view mode. The size of thumbnail images displayed in full-view mode may be greater than the size of thumbnail images displayed in a compact-view mode. A channel list, an external input image list, or both, may be displayed on the display either in compact-view mode or full-view mode.

The video encoder 230 may encode a video signal provided by the format converter 220 by performing JPEG encoding or MPEG-2 encoding. Still images or moving images encoded by the video encoder may be displayed on the display as thumbnail images.

In addition, the stream encoder may re-encode or multiplex an encoded video signal provided by video encoder 230, the audio and data signals obtained by the multiplexing performed by demultiplexer 210 into a stream, for example, an MPEG-2 TS.

In one exemplary embodiment, channel-browsing processor 170 may extract some of the video frames of each of a plurality of broadcast signals and a plurality of external input signals and may re-encode the extracted video frames. Then, the re-encoded images may be displayed on display 180 as thumbnail images in response to user input requesting the display of a channel list or an external input image list. In this manner, the user may intuitively identify the content of broadcast programs received from various channels or external input signals provided by various external input devices.

Figure 3A:
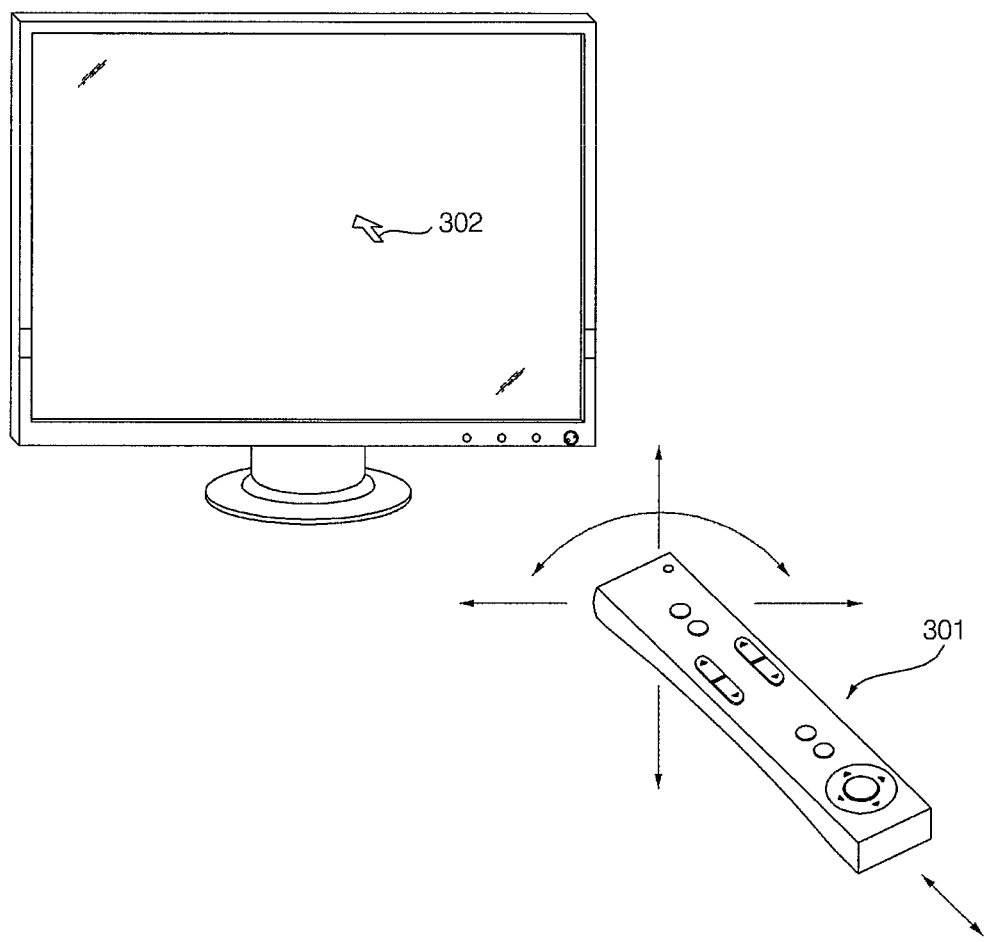
FIGS. 3A and 3B are diagrams showing examples of remote control device(s) that may be used with the apparatus of FIG. 1.
Figure 3B:
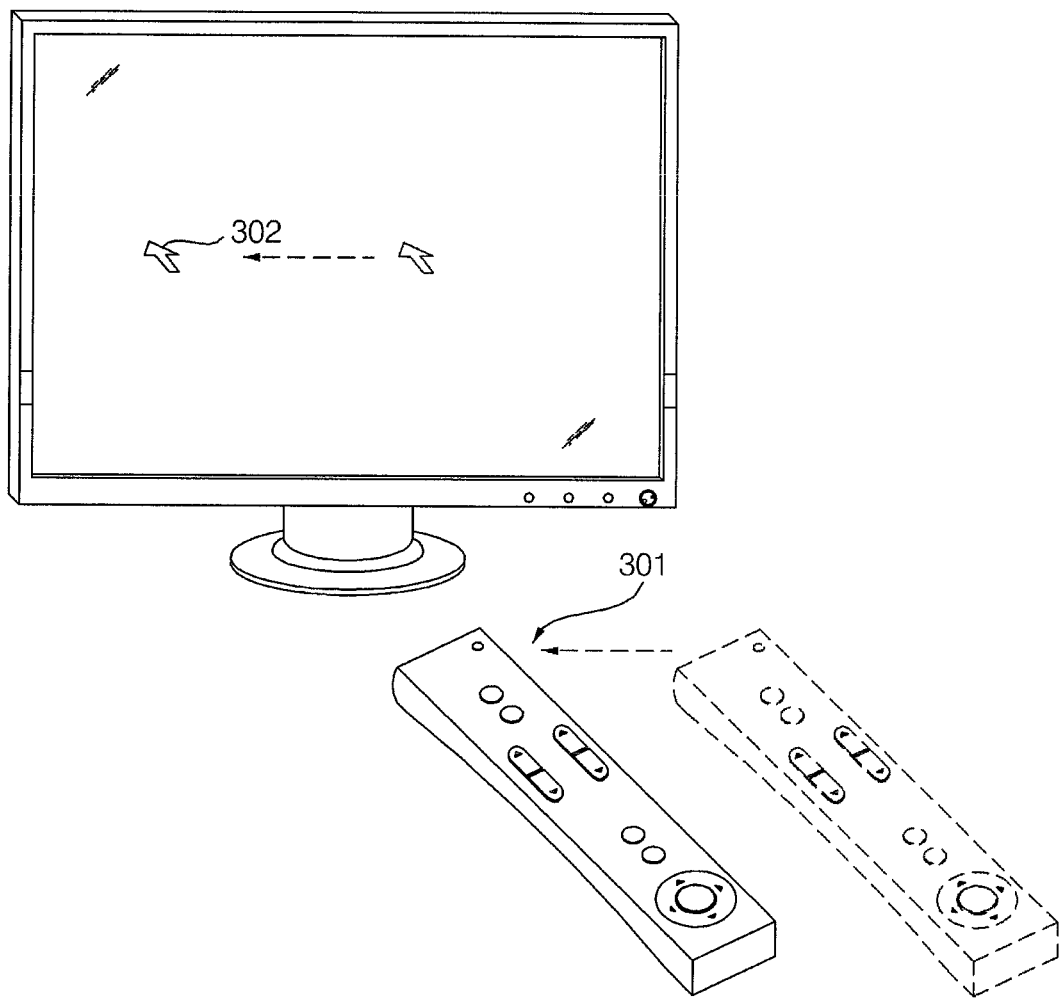

FIGS. 3A and 3B show an example of the remote control device 200 of FIG. 1. In this example, the remote control device is shown as a spatial remote control device 301. In operation, the spatial remote control may transmit RF signals to and/or receive RF signals from image display apparatus 100 based on, for example, an RF communication standard. A pointer 302 (representing the movement of the spatial remote control 301) may be displayed on the image display apparatus.

The user may move the spatial remote control up and down, back and forth, and side to side or may rotate spatial remote control 301, and pointer 302 may move in accordance with movement of the spatial remote control as shown in FIG. 3B.

Referring to FIG. 3A, if the user moves the spatial remote control to the left, the pointer may move to the left accordingly. The spatial remote control may include a sensor capable of detecting motion of the remote control. The sensor may detect the movement of the spatial remote control and may then transmit motion information corresponding to the results of the detection to image display apparatus 100. The image display apparatus may then determine the movement of spatial remote control 301 based on the motion information and may then calculate the coordinates of a target point to which pointer 302 should be shifted in accordance with the movement of the spatial remote control 301 based on the results of the determination.

Referring to FIGS. 3A and 3B, the pointer 302 may move according to whether the spatial remote control 301 moves vertically or horizontally or whether it rotates. The moving speed and direction of the pointer may correspond to or otherwise be based on the moving speed and direction of the spatial remote control 301.

In an exemplary embodiment, the pointer may move in accordance with movement of the spatial remote control 301. Alternatively, an operation command may be input into image display apparatus 100 in response to the movement of the spatial remote control 301. That is, as spatial remote control 301 moves back and forth, an image displayed on the image display apparatus 100 may be gradually enlarged or reduced.

Figure 4:
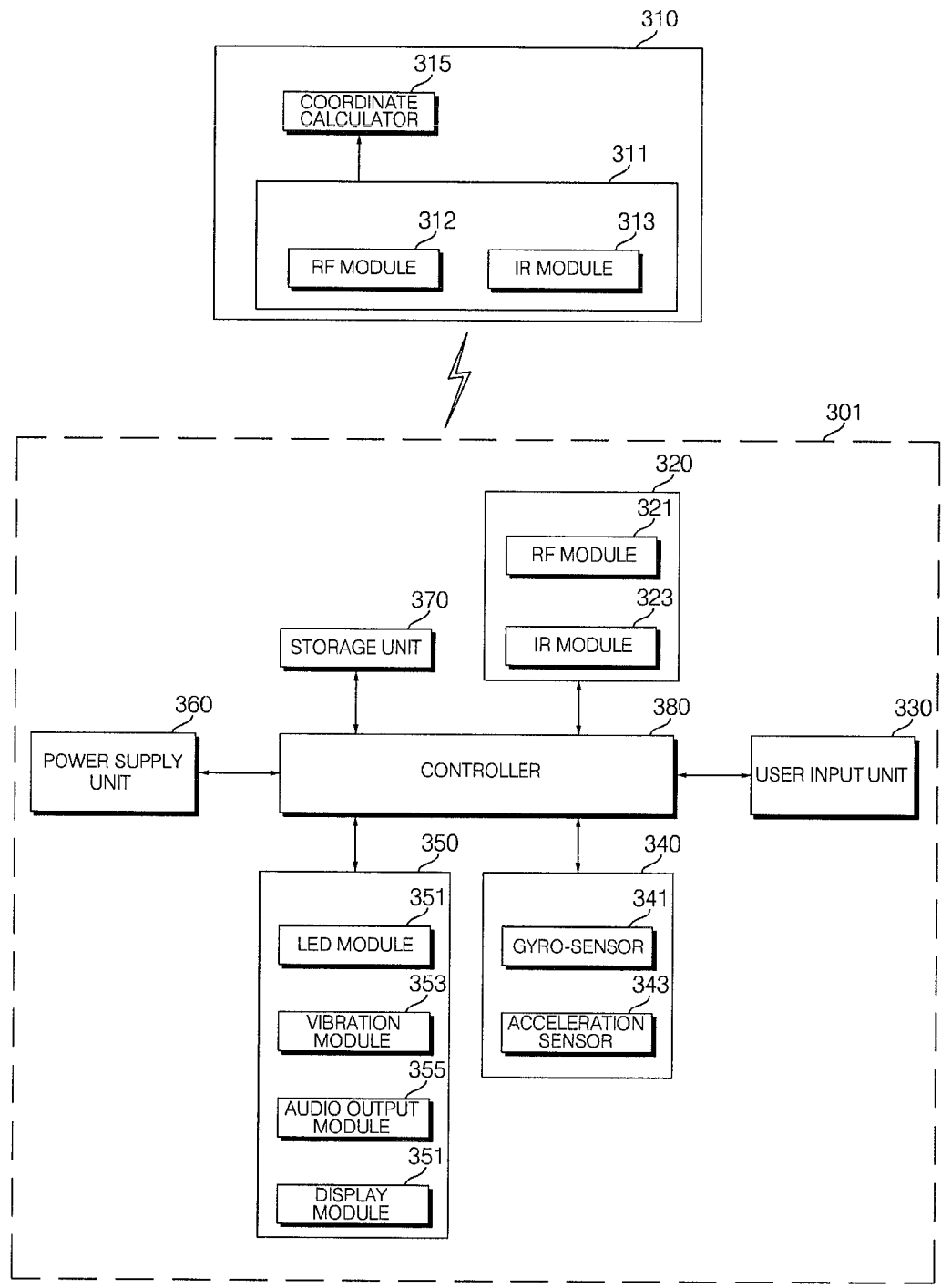
FIG. 4 is a diagram of a spatial remote control shown in FIG. 3 and an interface shown in FIG. 1.

FIG. 4 shows a more detailed view of the spatial remote control 301 shown in FIGS. 3A and 3B and interface 150 shown in FIG. 1. Referring to FIG. 4, spatial remote control 301 may include a wireless communication unit 320, a user input unit 330, a sensor unit 340, an output unit 350, a power supply unit 360, a memory unit 370 and a controller 380.

The wireless communication module 320 may transmit signals to and/or receive signals from image display apparatus 100. The wireless communication module 320 may include an RF module 321 which enables the spatial remote control to transmit RF signals to and/or receive RF signals from image display apparatus 100 according to the RF communication standard. The wireless communication module 320 may also include an IR module 323 which enables spatial remote control 301 to transmit IR signals to and/or receive IR signals from image display apparatus 100 according to the IR communication standard.

The spatial remote control 301 may transmit motion information regarding movement of the spatial remote control to image display apparatus 100 through RF module 321. The spatial remote control may also receive various signals from the image display apparatus through the RF module. The spatial remote control 301 may transmit to the image display apparatus commands such as commands to turn on or off the image display apparatus and to switch channels or change sound volume through the IR module 323, if necessary.

The user input unit 330 may include a keypad and/or a plurality of buttons. The user may input various commands to image display apparatus 100 by manipulating the user input unit. If the user input unit includes a plurality of hard-key buttons, the user may input various commands to the image display apparatus by pressing the hard-key buttons. Alternatively, or additionally, if the user input unit includes a touch screen displaying a plurality of soft-keys, the user may input various commands to the image display apparatus by touching the soft-keys. The user input unit may also include various input tools other than those set forth herein, such as a scroll key and/or a jog key.

The sensor unit 340 may include a gyro-sensor 341 and/or an acceleration sensor 343. The gyro-sensor may sense the spatial movement of remote control 301, for example, in X-, Y-, and Z-axis directions, and the acceleration sensor may sense the moving speed of the remote control.

The output unit 350 may output a video and/or audio signal corresponding to a manipulation of user input unit 330 or a signal transmitted by image display apparatus 100. The user may easily identify whether user input unit 330 has been manipulated or whether image display apparatus 100 has been controlled based on the video and/or audio signal output by the output unit 350.

The output unit may include an LED module 351 which is turned on or off whenever user input unit 330 is manipulated or whenever a signal is received from or transmitted to image display apparatus 100 through wireless communication unit 320, a vibration module 353 which generates vibration, an audio output module 355 which outputs audio data, and a display module 357 which outputs video data.

The power supply unit 360 may supply power to the spatial remote control 301. If motion of the spatial remote control is not detected for more than a predetermined amount of time, the power supply unit may, for example, reduce or cut off supply of power to the spatial remote control in order to prevent power from being unnecessarily wasted. The power supply unit may resume a normal or predetermined level of power when, for example, any key or a specific key on the spatial remote control is manipulated.

The memory 370 may store various application data for controlling or driving spatial remote control 301. The spatial remote control may wirelessly transmit signals to and/or wirelessly receives signals from image display apparatus 100 with the aid of RF module 321 using a predetermined frequency band. For this, controller 380 of the spatial remote control may store information regarding the frequency band used for the spatial remote control to wirelessly transmit signals to and/or wirelessly receive signals from the image display apparatus in memory unit 370 and may then reference this information for later use.

The controller 380 may control the general operation of spatial remote control 301. For example, the controller may transmit a signal corresponding to a key manipulation detected from user input unit 330 or a signal corresponding to motion of the spatial remote control, as sensed by sensing unit 340, to the interface of the image display apparatus 100.

The interface 150 may include a wireless communication module 311 which wirelessly transmits signals to and/or wirelessly receives signals from spatial remote control 301, and a coordinate calculator 315 which calculates a pair of coordinates representing the position of pointer 302 on the display screen that is to be moved in accordance with the movement of the spatial remote control 301.

The wireless communication module 311 may include RF module 312 and IR module 313. The RF module may wirelessly transmit RF signals to and/or wirelessly receive RF signals from RF module 321 of the spatial remote control. And, the IR module may wirelessly transmit IR signals to and/or wirelessly receive IR signals from IR module 321 of the spatial remote control.

The coordinate calculator 315 may receive motion information regarding movement of the spatial remote control 301 from wireless communication unit 320 of the spatial remote control and may calculate a pair of coordinates (x, y) representing the position of pointer 302 on a screen of display 180 based on and/or by correcting the motion information for possible errors such as a shake in the user's hand.

A signal transmitted to image display apparatus 100 by spatial remote control 301 may be received by interface 310, and the interface may transmit the received signal to controller 160. Then, the controller may acquire information regarding the movement of spatial remote control 301 or information regarding a key manipulation detected from spatial remote control 301 from the signal provided by interface 310, and may control image display apparatus 100 with reference to the acquired information.

The image display apparatus 100, remote control device 200, and spatial remote control 301 are shown in FIG. 1 or 4 as having a number of components in a given configuration. However, the image display apparatus, remote control device, and/or spatial remote control may include fewer components or additional components than those shown in FIGS. 1 to 4 in alternative embodiments. Also, two or more components of image display apparatus 100, remote control device 200, and/or spatial remote control 301 may be combined into a single component in alternative embodiments. The functions of the image display apparatus, the remote control device, and spatial remote control 301 as set forth herein are illustrative in nature and may be modified to satisfy, for example, the purposes of a given application.

Figure 5:
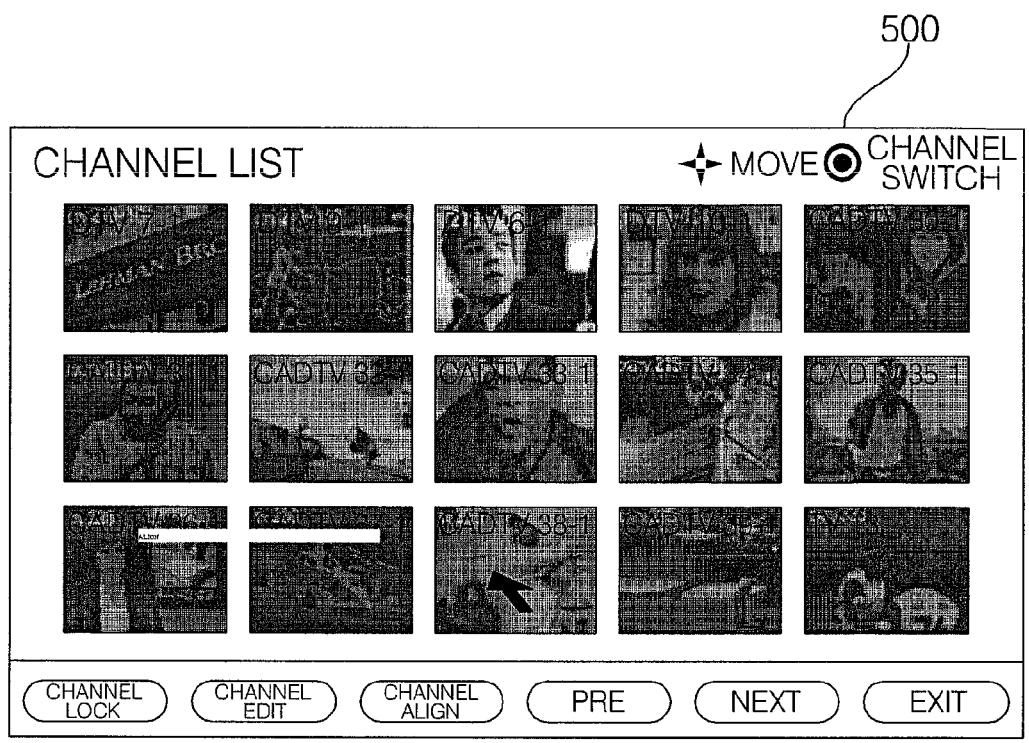
FIG. 5 illustrates is a diagram of a screen for which may be used to explaining the operation of the channel-browsing processor shown in FIG. 2.

FIG. 5 shows a screen that explains an example of some operations that may be performed by channel-browsing processor 170 of FIG. 2. If a command to display an input image list is issued, and particularly if a 'channel list' menu is selected, thumbnail-image list (or screen) 500 may be displayed. This screen includes a plurality of thumbnail images that respectively correspond to a plurality of broadcast image signals received from various channels received by the image display apparatus 100. Thumbnail-image screen 500 may be given and displayed with a title (e.g., "Channel List"), for example, at the top or some other predetermined location of display 180.

In one embodiment, the thumbnail images may be displayed in full-view mode on the entire display 180. This will allow a user to intuitively, or deductively, recognize the content of broadcast programs received from corresponding channels.

One or more of the thumbnail images may include external input device information, such as at least one of channel name information, channel number information or an input port name indicating an input port of the image display apparatus 100 to which an external input device is connected.

The thumbnail-image list 500 may also include an area corresponding to an 'edit' menu, which may be used for editing the thumbnail images displayed in the thumbnail-image list. The 'edit' menu may include icons corresponding to various sub-menus including, for example, any one or more of a 'channel lock' menu for locking a thumbnail image so that the thumbnail image cannot be edited, a 'channel edit' menu for editing a thumbnail image, a 'channel align' menu for aligning thumbnail images, a 'pre' menu for navigating to a previous thumbnail-image list, a 'next' menu for navigating to a next thumbnail-image list, and an 'exit' for exiting to other menus.

The thumbnail images displayed in screen 500 may be still images or moving images. Also, or alternatively, the thumbnail images displayed in screen may be images currently being input to image display apparatus 100 or images previously stored in the image display apparatus.

In one embodiment, the thumbnail images displayed in thumbnail-image list 500 are images obtained by a channel-browsing operation performed by the channel-browsing processor 170. For example, the thumbnail images displayed in the thumbnail-image list may be video frames extracted from external input image signals provided by an external input device or video frames extracted from broadcast image signals received via an antenna port. The channel-browsing operation performed by channel-browsing processor 170 has been described above with reference to FIG. 2.

If one of the thumbnail images displayed in thumbnail-image list 500 is selected, a broadcast image signal corresponding to the selected thumbnail image may be displayed on the entire display 180.

If one of the thumbnail images displayed in the thumbnail-image list is brought into focus, for example, by being pointed at by a cursor or a pointer or by being highlighted or enlarged, program information regarding a broadcast image signal corresponding to the focused thumbnail image may be displayed. Thereafter, if one of the thumbnail images displayed in the thumbnail-image list is brought into focus and then the 'edit' menu is selected, a channel providing the broadcast image signal corresponding to the focused thumbnail image may be registered as a favorite channel, may be deleted or may be locked.

The thumbnail-image list 500 may include one or more thumbnail images corresponding to broadcast image signals received through channels previously deleted from the image display apparatus. The thumbnail images corresponding to the broadcast image signals received from the previously-deleted channels may be displayed in the thumbnail-image list differently from other thumbnail images corresponding to broadcast image signals received from other yet-to-be-deleted channels so as to be able to them to be easily distinguished. For example, the thumbnail images corresponding to broadcast image signals received from deleted channels may be different from thumbnail images corresponding to broadcast image signals received from other, yet-to-be-deleted channels in terms of at least one of brightness, contrast, fade, or transparency.

A plurality of thumbnail images respectively corresponding to a plurality of broadcast image signals may be classified into one or more groups according to their respective channel numbers and whether their respective channels are favorite channels, recently-viewed channels, and/or previously-deleted channels and may be displayed in thumbnail-image list 500 in units of the groups.

If the 'next' or 'pre' menu is selected from the thumbnail-image list, a next or previous thumbnail-image list to the thumbnail-image list may be displayed on display 180 through a drag, scroll, or rotation of the thumbnail-image list. A cursor or a pointer may be freely moved on the thumbnail-image list 500 in response to user input.

The thumbnail-image list 500 is shown in FIG. 5 as being displayed in full-view mode on the entire display 180. However, variations are possible. For example, the thumbnail-image list 500 may alternatively be displayed in compact-view mode on a certain part of the display 180.

The thumbnail images displayed in the thumbnail-image list may be updated either periodically or randomly, and/or either independently or all together. The thumbnail images displayed in the thumbnail-image list may also be updated with images provided by channel-browsing processor 170.

Figure 6:
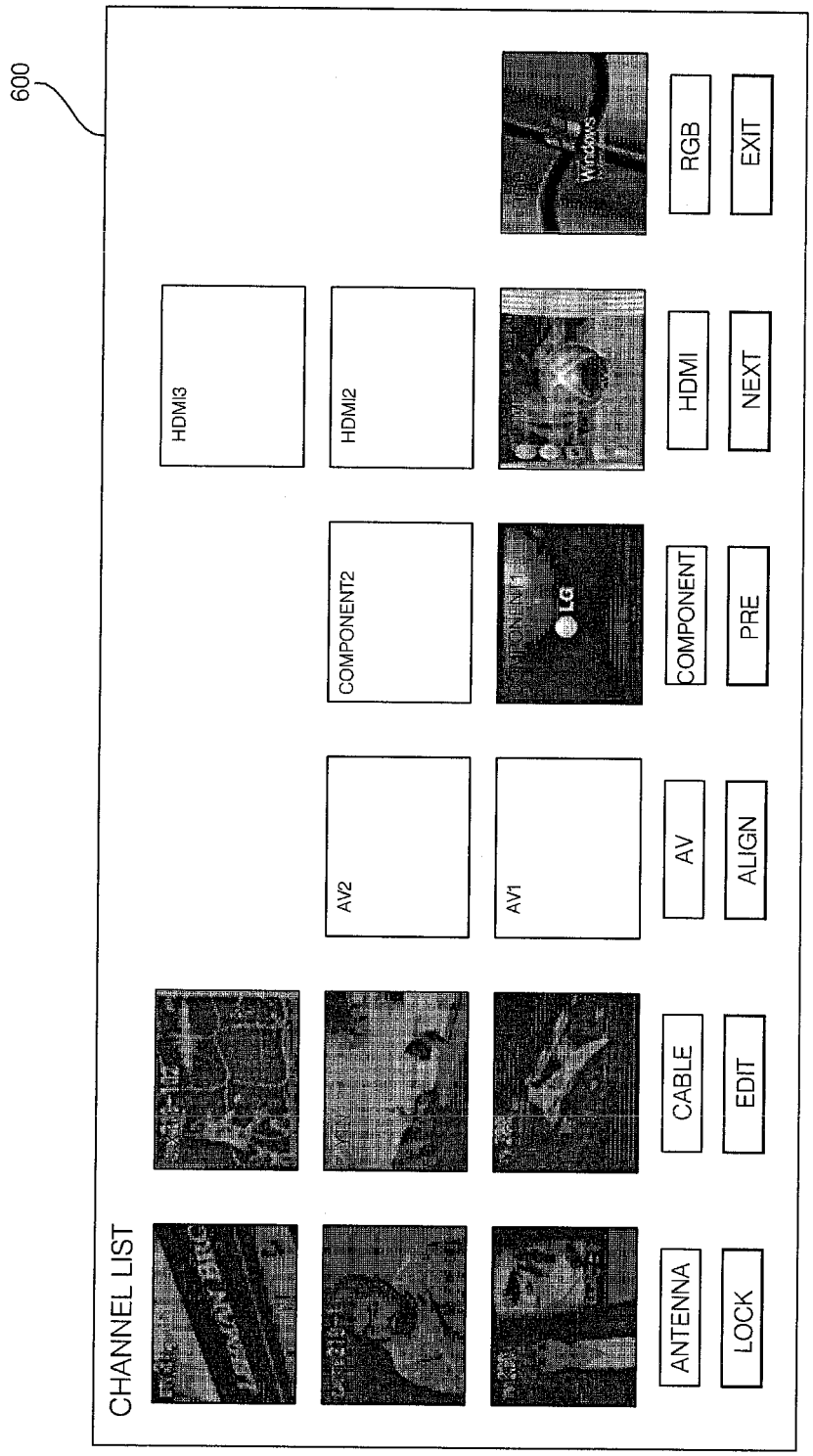
FIG. 6 is a flowchart showing steps included in an operating method of an image display apparatus.

FIG. 6 shows a screen for explaining another example of operation of channel-browsing processor 170 shown in FIG. 2. If an 'external input image list' menu is selected, a thumbnail-image list (or screen) 600 including a plurality of thumbnail images respectively corresponding to a plurality of external input image signals may be displayed on the display 180. Thumbnail-image screen 600 is illustrated as not only including the thumbnail images corresponding to the external input image signals, but also including a plurality of thumbnail images respectively corresponding to a plurality of broadcast image signals received from various channels received by image display apparatus. That is, the thumbnail images corresponding to broadcast image signals may also be displayed in thumbnail-image list 600 along with the thumbnail images corresponding to the external input image signals in response to the selection of a 'channel list' menu.

The image display apparatus 100 may include various input ports such as an Ethernet port, a USB port, a CVBS port, a component port, an S-video port, a DVI port, an HDMI port, an RGB port, a D-sub port, an IEEE 1394 port, an SPDIF port, and a LiquidHD port and may thus be connected to an external input device via the various I/O ports. The image display apparatus may also include an antenna port and may thus receive various terrestrial or cable broadcast programs via the antenna port.

A plurality of thumbnail images respectively corresponding to a plurality of broadcast image signals may be classified into an 'antenna' group including a number of thumbnail images corresponding to one or more terrestrial broadcast image signals received from various terrestrial channels and a 'cable' group including a number of thumbnail images corresponding to one or more cable broadcast image signals received from various cable channels. The 'antenna' group and the 'cable' group may be displayed in an 'antenna' area and a 'cable' area, respectively, defined in thumbnail-image list 600.

Similarly, a plurality of thumbnail images corresponding to a plurality of external input image signals provided by one or more external input devices may be classified into:

a 'component' group including a number of thumbnail images corresponding to one or more external input image signals received via one or more component ports of image display apparatus 100, an 'HDMI' group including a number of thumbnail images corresponding to one or more external input image signals received via one or more HDMI ports of the image display apparatus, an 'RGB' group including a number of thumbnail images corresponding to one or more external input image signals received via one or more RGB ports of the image display apparatus, and an 'A/V' group including a number of thumbnail images corresponding to one or more external input image signals received via all the input ports of the image display apparatus except for the component port(s), the HDMI port(s), and the RGB port(s).

The 'component' group, the 'HDMI' group, the 'RGB' group, and the 'A/V' group may be displayed in a 'component' group, an 'HDMI' area, an 'RGB' area, and an 'A/V', respectively, defined in the thumbnail-image list 600.

More specifically, when the image display apparatus is connected to an external input device, thumbnail-image list 600, which includes a plurality of thumbnail images respectively corresponding to a plurality of external input image signals provided by the external input device, may be displayed on display 180. Using this screen, a user may intuitively identify the external input device connected to the image display apparatus and the external input image signals provided by the external input device.

Referring to FIG. 6, a plurality of thumbnail images respectively corresponding to a plurality of broadcast image signals received from various terrestrial channels such as MBC, KBS1 and KBS2 may be displayed in a row in an 'antenna' area in the thumbnail-image list 600, and a plurality of thumbnail images respectively corresponding to a plurality of broadcast image signals received from various cable channels such as XTM, YTN and OCN may be displayed in a row in a 'cable' area defined in the thumbnail-image list 600.

When there is an external input device connected to image display apparatus 100 but no external input image signal is received from the external input device, a default thumbnail image such as those labeled 'component 1', 'HDMI1' and 'RGB' may be displayed. When there is no external input device connected to the image display apparatus 100, a blank thumbnail image such as those labeled 'AV1', 'AV2', 'COMPONENT 1', 'HDMI2' and 'HDMI3' may be displayed.

Therefore, the user may intuitively identify an external input device, if any, connected to image display apparatus 100 and a number of external input image signals, if any, provided by an external input device.

A thumbnail image may include information regarding an external input device. The external input device information may include at least one of channel name information, channel number information and input port name indicating an input port of the image display apparatus 100 to which an external input device is connected.

The thumbnail images displayed in thumbnail-image list 600 may be still images or moving images. The thumbnail images displayed in the thumbnail-image list may be images currently being input to the image display apparatus or images previously stored in the image display apparatus.

The thumbnail images displayed in the thumbnail-image list may be images obtained by a channel-browsing operation performed by channel-browsing processor 170. For example, the thumbnail images displayed in thumbnail-image list 600 may be either video frames extracted from external input image signals provided by an external input device or video frames extracted from broadcast image signals received via an antenna port. The channel-browsing operation performed by channel-browsing processor 170 has been described above with reference to FIG. 2.

The thumbnail-image list 600 is shown in FIG. 6 as not only providing two areas for displaying a channel list such as the 'antenna' area and the 'cable' area, but also providing four areas for displaying an external input image list such as the 'A/V' area, the 'component' area, the 'HDMI' area and the 'RGB' area. Variations are possible. For example, thumbnail-image list 600 may only provide the 'A/V' area, the 'component' area, the area and the 'RGB' area.

Figure 7:
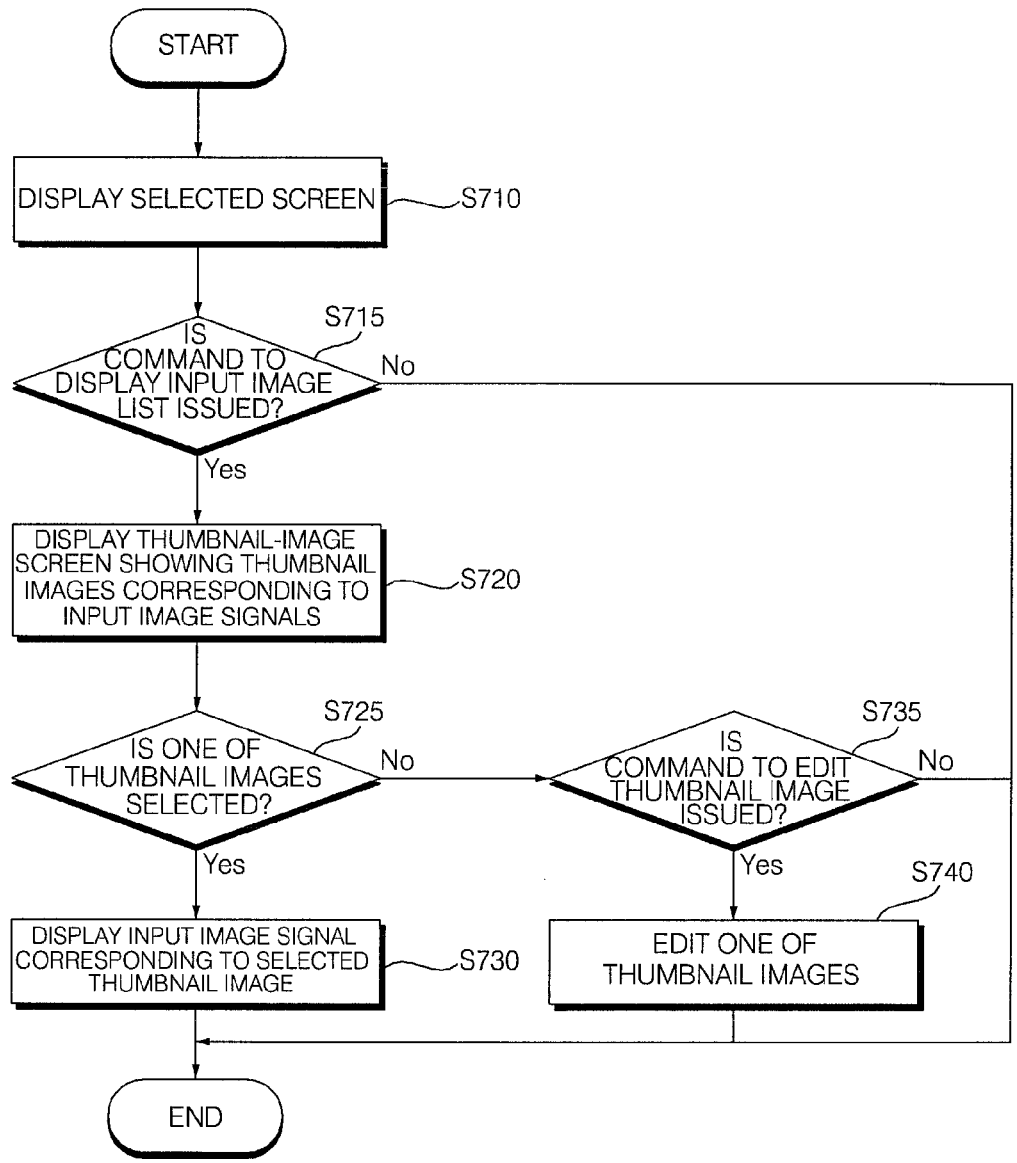
FIG. 7 is a diagram explaining display of an external input image list.
Figure 8:
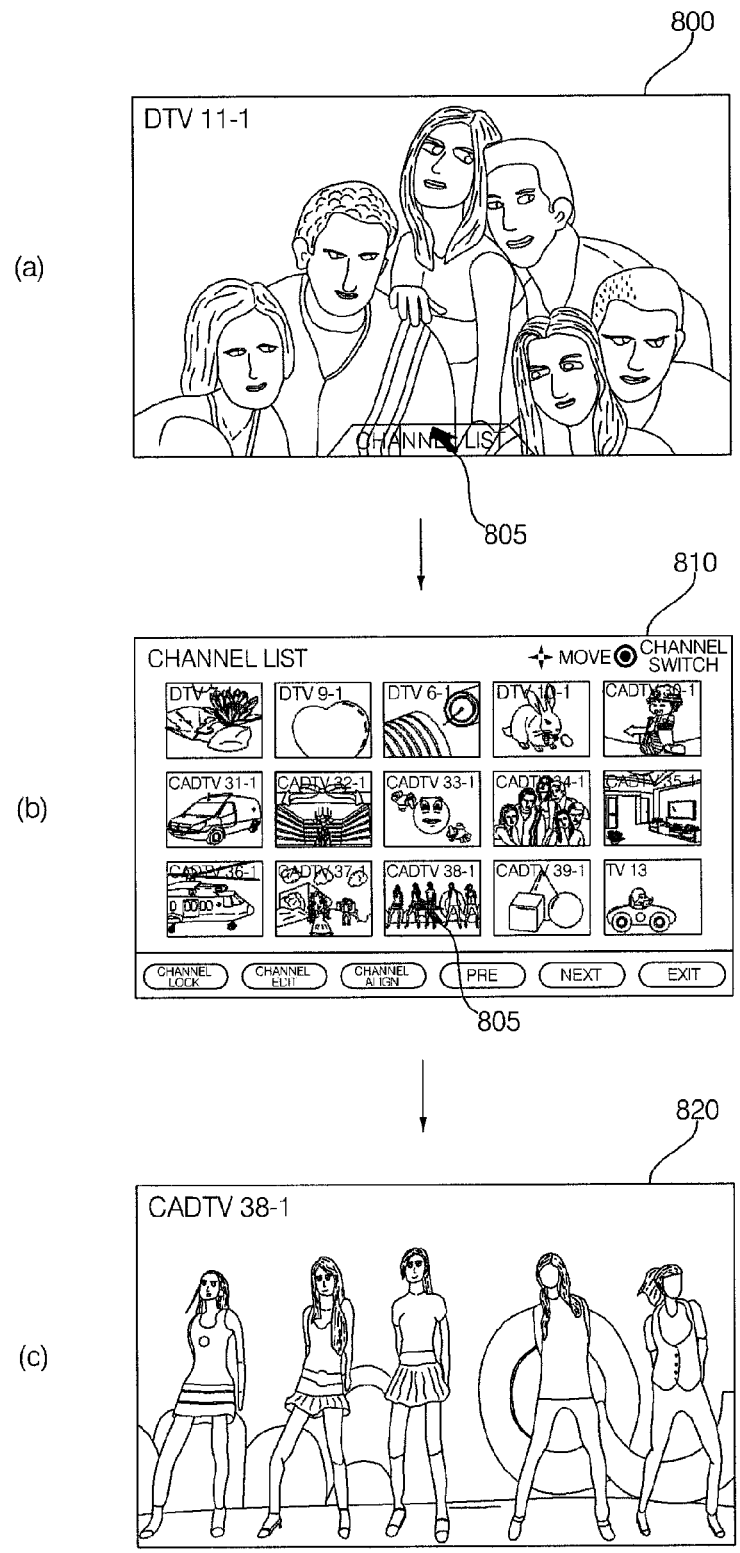
FIGS. 8 through to 12 illustrate are diagrams for explaining how to display a channel list is displayed.
Figure 9:
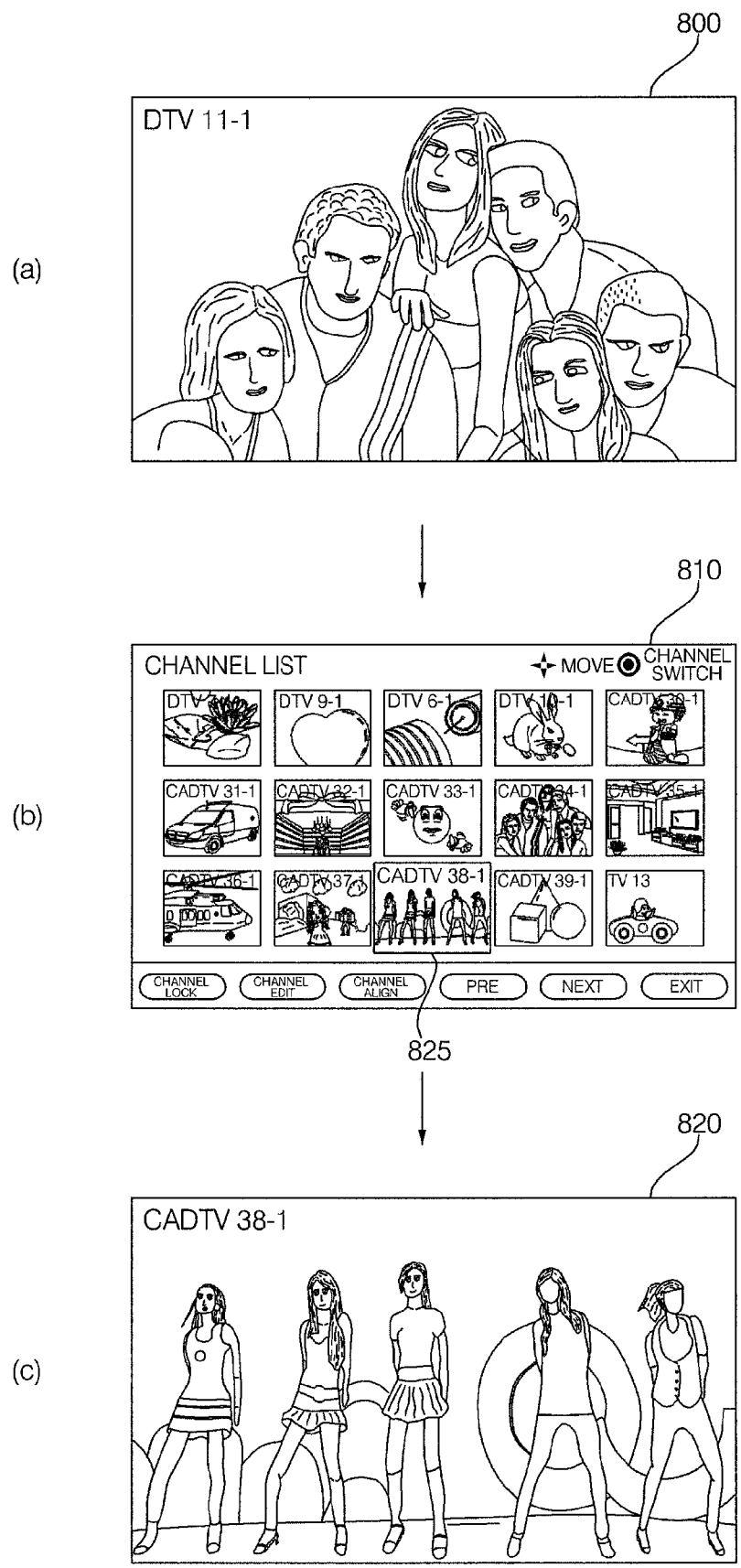
Figure 10:
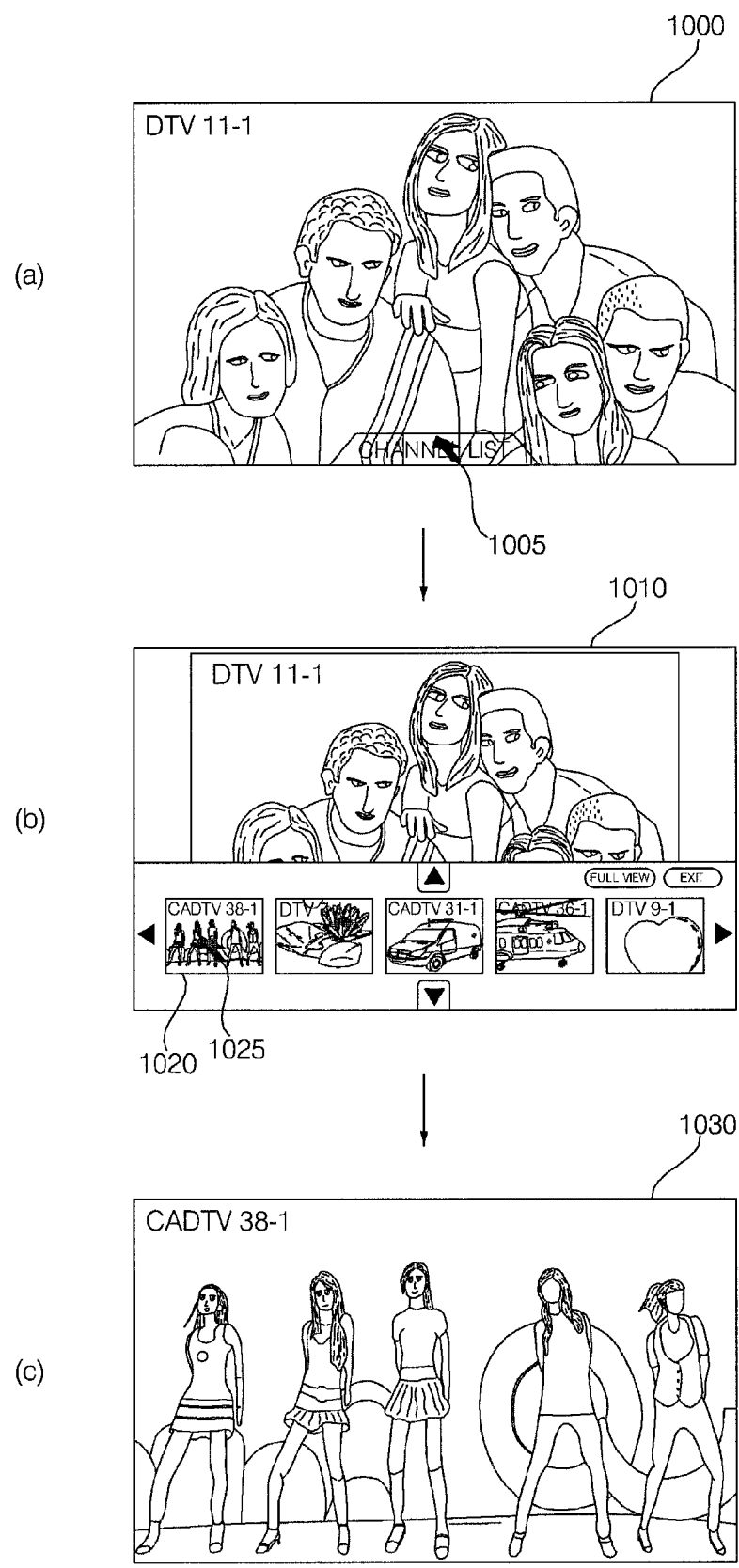
Figure 11:
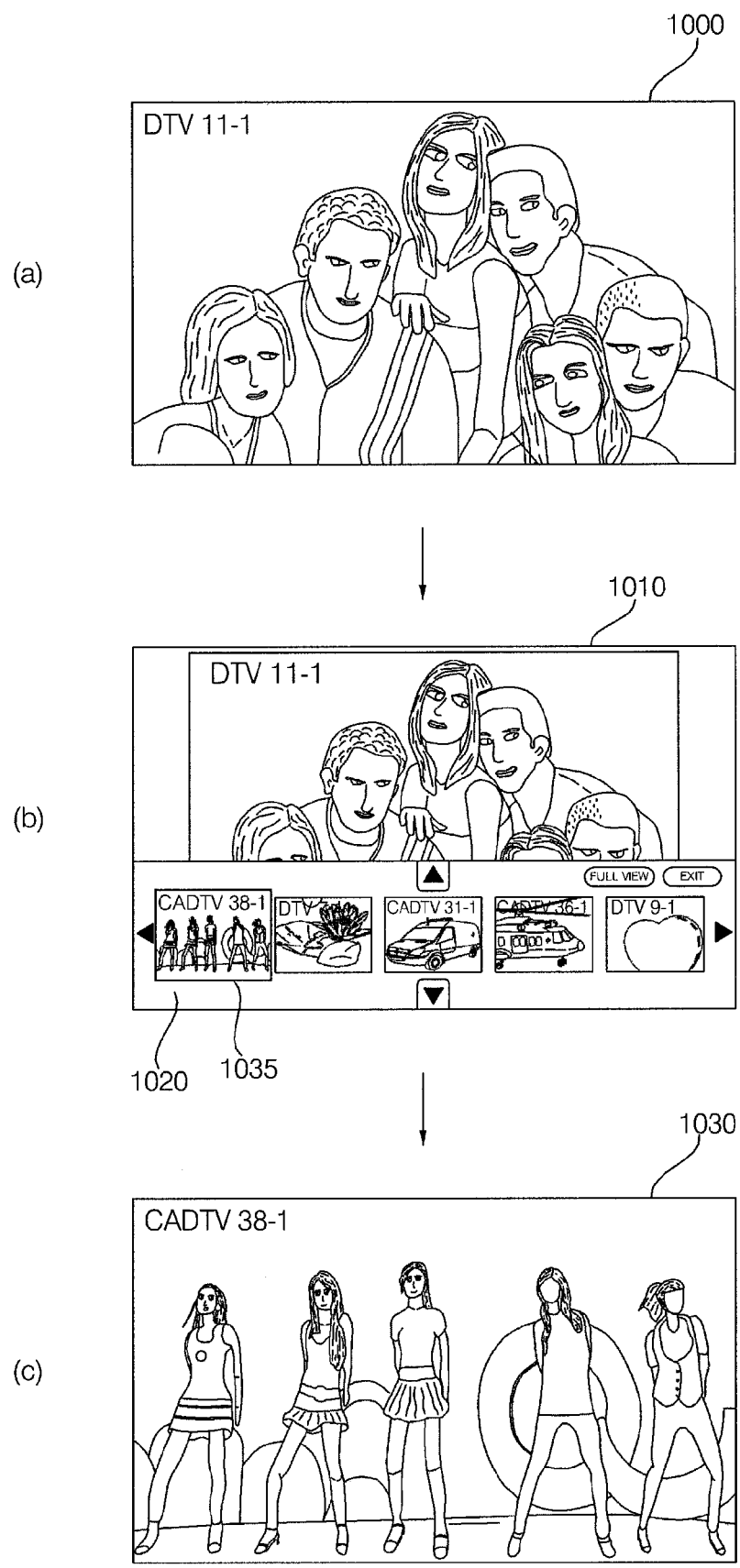

FIG. 7 shows steps included in one embodiment of an operating method of an image display apparatus. The method includes selecting a screen by a user for display on display 180 (S710). The selected screen may be a menu screen, a broadcast screen, a multimedia play screen, an external input screen, or a webpage screen.

Thereafter, if a command to display an input image list is issued (S715), a thumbnail image screen including a plurality of thumbnail images respectively corresponding to a plurality of input image signals may be displayed on the display 180 (S720). The thumbnail image screen displayed in operation S720 may be a thumbnail-image list (e.g., thumbnail-image list 500 in FIG. 5) for broadcast image signals or a thumbnail-image list (e.g., thumbnail-image list 600 in FIG. 6) for external input image signals.

A number of thumbnail images respectively corresponding to a number of broadcast image signals received through various channels previously added to the image display apparatus with the use of a channel-add function may be displayed in a compact-view mode on display 180. The previously-added channels may be received via the second tuner 125, and a plurality of thumbnail images respectively corresponding to a plurality of broadcast image signals received from the previously-added channels may be displayed in a compact-view mode on display module 180.

Thereafter, if one of the thumbnail images is selected in response to user input (S725), an input image signal corresponding to the selected thumbnail image may be displayed on the display (S730).

One of the thumbnail images may be brought into focus in response to user input before being selected in operation S725. More specifically, one of the thumbnail images may be brought into focus by being pointed at by a cursor, highlighted or enlarged in response to a direction-key input made via a remote control or a pointer input made, for example, via a spatial remote control. It is possible to navigate through the thumbnail images by bringing any one of the thumbnail images into focus and dragging the focused image.

Thereafter, if a command to edit one of the thumbnail-image is issued (S735), one of the thumbnail images may be edited (S740). For example, if the 'edit' menu is selected when one of the thumbnail images is brought into focus, the focused thumbnail image may be edited. Examples of the editing of a thumbnail image include registering the source of an input image signal corresponding to the thumbnail image as a favorite input source, deleting the source of an input image signal corresponding to the thumbnail image, or locking the thumbnail image.

FIGS. 8 through 12 how a channel list may be displayed.

Referring to FIGS. 8(a) and 8(b), if an 'channel list' menu is selected by being pointed at by a pointer 850 when a broadcast screen 800 showing a terrestrial broadcast image signal received from channel 'DTV 11-1' is displayed on display 180, a thumbnail-image list (or screen) 810 including a plurality of thumbnail images respectively corresponding to a plurality of broadcast image signals received from various channels received by image display apparatus 100 may be displayed in a full-view mode on the entire display 180.

Thereafter, referring to FIG. 8(c), if one of the thumbnail images displayed in thumbnail-image list 810 (e.g., a thumbnail image corresponding to a cable broadcast image signal received from channel 'CADTV 38-1') is selected by being pointed at by pointer 805, a broadcast screen 820 showing a cable broadcast image signal received from channel 'CADTV 38-1 may be displayed on the entire display 180.

Alternatively, referring to FIG. 9(b), each of the thumbnail images displayed in thumbnail-image list 810 may be selected by a cursor 825, rather than by the pointer 805.

Referring to FIGS. 10(a) and 10(b), if a 'channel list' menu is selected by being pointed at by a pointer 1050 when a broadcast screen 1000 showing a terrestrial broadcast image signal received from channel 'DTV 11-1' is displayed on the display 180, a thumbnail-image list 1020 including a plurality of thumbnail images respectively corresponding to a plurality of broadcast image signals received from various channels received by the image display apparatus 100 may be displayed in a compact-view mode on a certain part of the display 180.

Referring to FIG. 10(c), if one of the thumbnail images displayed in the thumbnail-image list (or screen) 1020, e.g., a thumbnail image corresponding to a cable broadcast image signal received from channel 'CADTV 38-1,' is selected by being pointed at by a pointer 1005, a broadcast screen 1030 showing a cable broadcast image signal received from channel 'CADTV 38-1' may be displayed on the entire display 180.

Alternatively, referring to FIG. 11(b), each of the thumbnail images displayed in the thumbnail-image list 1020 may be selected by a cursor 1035, rather than by the pointer 1005.

Referring to FIG. 12(a), a thumbnail-image list 120 including a plurality of thumbnail may be displayed in a full-view mode on the entire display 180. Then, referring to FIG. 12(b), if one of the thumbnail images displayed in the thumbnail-image list 120 is brought into focus by being pointed at by a pointer 1205, an icon 1210, labeled 'information,' may be displayed over the focused thumbnail image.

Thereafter, referring to FIG. 12(c), if the icon 1210 is selected or brought into focus by the pointer 1205, a 'program guide' screen 1220 showing program information regarding a channel providing a broadcast image signal corresponding to the focused thumbnail image may be displayed on display 180. The program information may include at least one of the start time, end time and rating of a program currently broadcast on the channel represented by the focused thumbnail image, the start time, end time and rating of a previous program to the current program, and the start time, end time and rating of a next program to the current program.

Figure 12:
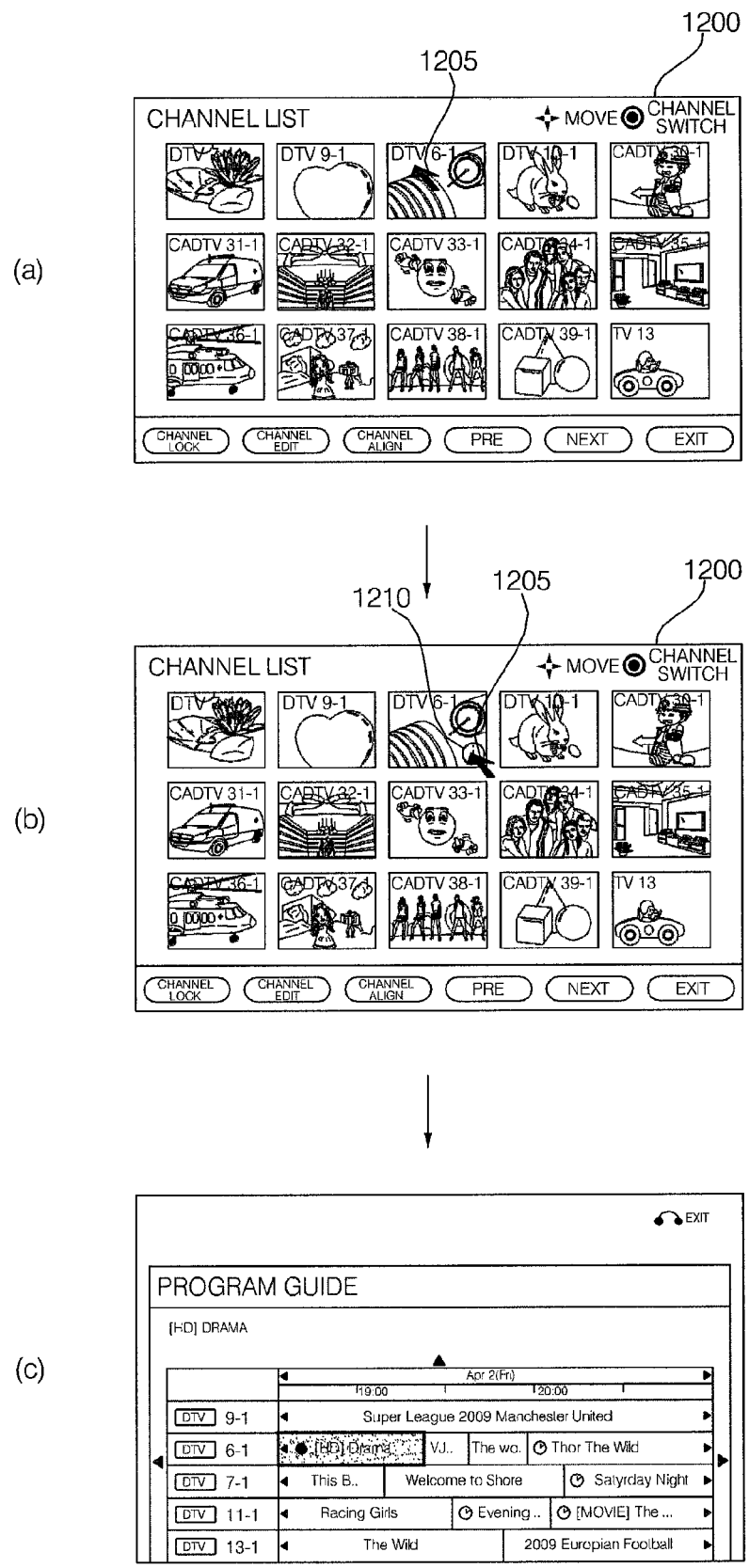

The 'program guide' screen 1220 may include not only program information of channels selected by the user but also program information of other non-selected channels. The icon 1210 is illustrated in FIG. 12 as being selected by the pointer 1205, but the present invention is not restricted to this. That is, the icon 1210 may be selected by a cursor.

Figure 13:
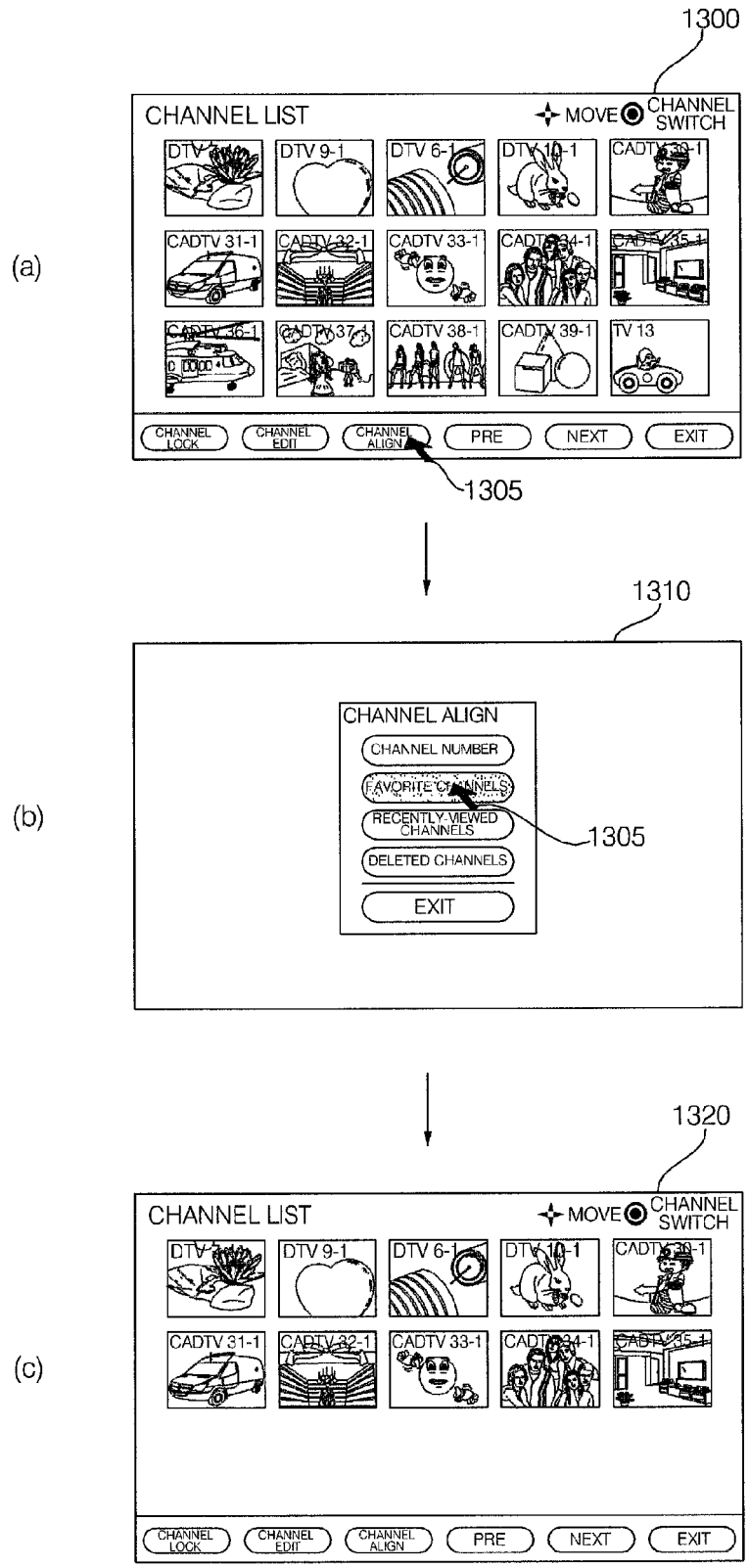
FIGS. 13 through 15 are diagrams explaining how a channel-align function may be performed when a channel list is displayed.
Figure 14:
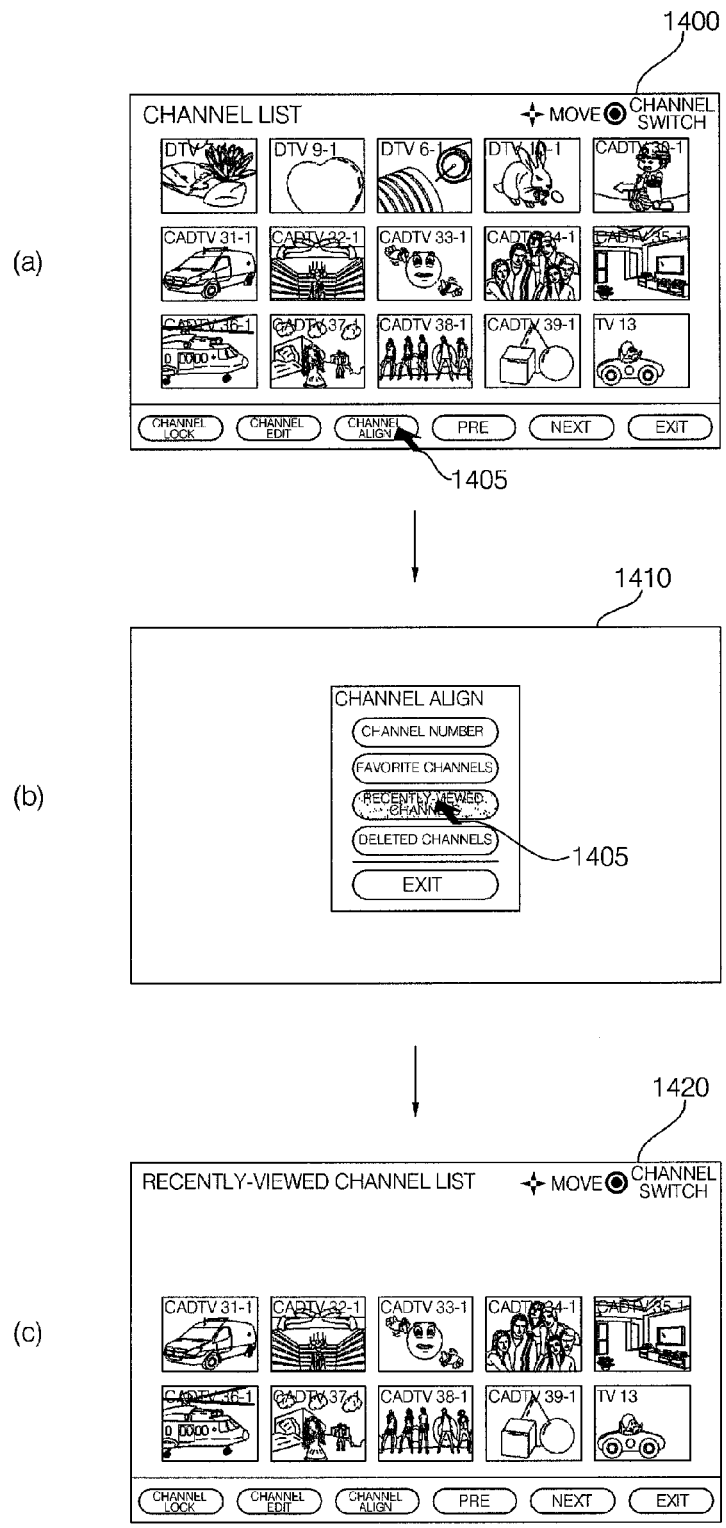
Figure 15:
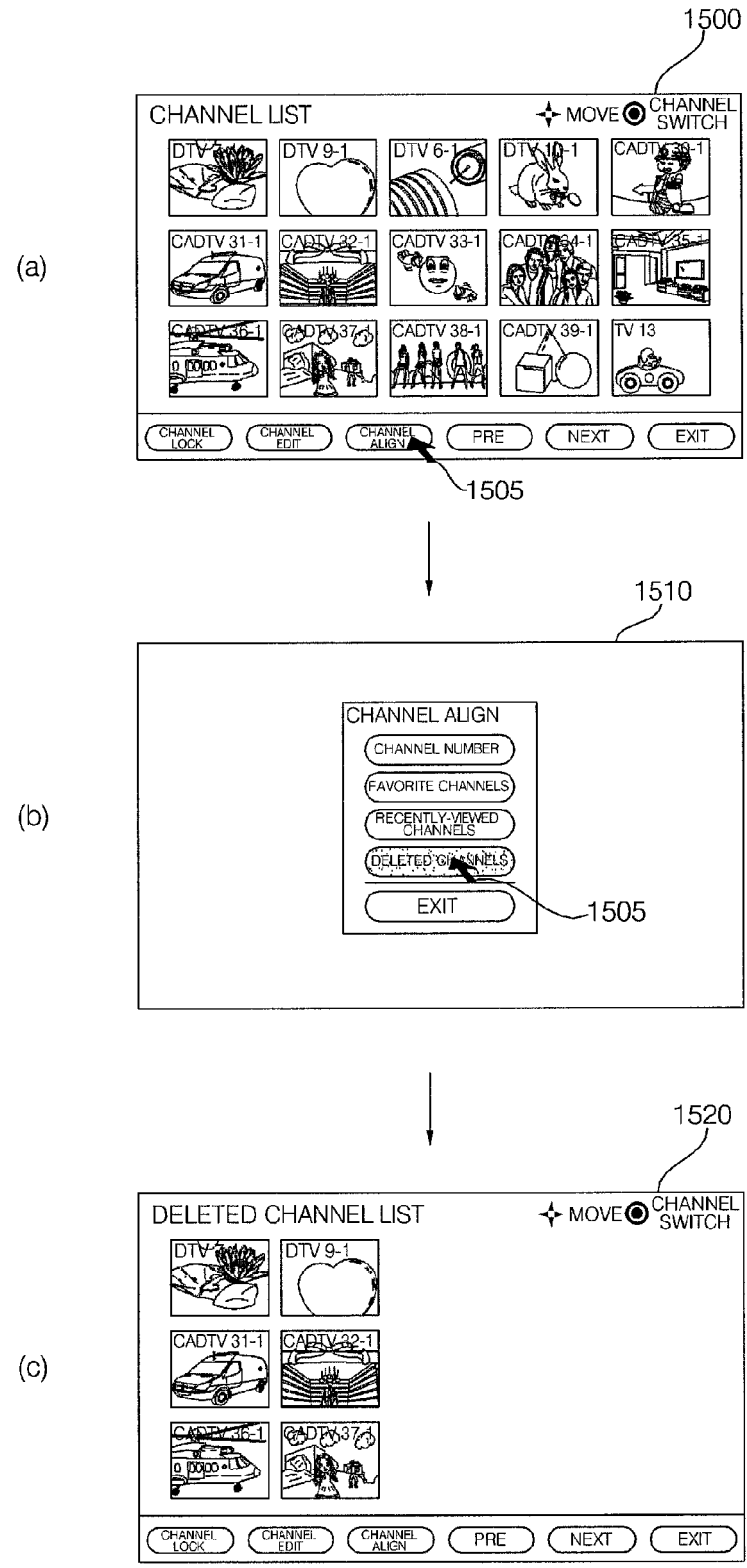

FIGS. 13 through 15 explaining how a channel-align function may be performed when a channel list is displayed.

Referring to FIG. 13(a), a thumbnail-image list 1300 including a plurality of thumbnail images respectively corresponding to a plurality of broadcast image signals received from various channels may be displayed in a full-view mode on the entire display 180. Then, if a 'channel align' menu is selected from the thumbnail-image list (or screen) 1300 by being pointed at by a pointer 1305, as shown in FIG. 13(a), a 'channel align' screen 1310 showing a plurality of menu items of the 'channel align' menu, i.e., a 'channel number' item, a 'favorite channels' item, a 'recently-viewed channels' item, and a 'deleted channels' item may be displayed on the display 180, as shown in FIG. 13(b).

If one of the menu items of the 'channel align' menu, e.g., the 'favorite channels' item, is selected by being pointed at by the pointer 1305, a 'favorite-channel list' screen 1320 including a plurality of thumbnail images respectively corresponding to a plurality of channels registered as favorite channels may be displayed on the display 180, as shown in FIG. 13(c).

The 'favorite channels' item is illustrated in FIG. 13 as being selected by the pointer 1305, but the present invention is not restricted to this. That is, the 'favorite channels' item may be selected by a cursor.

Alternatively, referring to FIGS. 14(a) through 14(c), if a 'recently-viewed channels' item is selected from a 'channel align' screen 1410 by being pointed at by a pointer 1405, a 'recently-viewed channels' screen 1420 including a plurality of thumbnail images respectively corresponding to a plurality of channels recently viewed by the user may be displayed on the display 180.

The 'channel align' menu and the 'recently-viewed channels' item are illustrated in FIG. 14 as being selected by the pointer 1405, but the present invention is not restricted to this. That is, the 'channel align' menu and the 'recently-viewed channels' item may be selected by a cursor.

Still alternatively, referring to FIGS. 15(a) through 15(c), if a 'deleted channels' item is selected from a 'channel align' screen 1510 by being pointed at by a pointer 1505, a 'deleted channels' screen 1520 including a plurality of thumbnail images respectively corresponding to a plurality of channels previously deleted by the user may be displayed on the display 180.

The 'deleted channels' item is illustrated in FIG. 15 as being selected by the pointer 1505, but the present invention is not restricted to this. That is, the 'deleted channels' item may be selected using a cursor.

Figure 16:
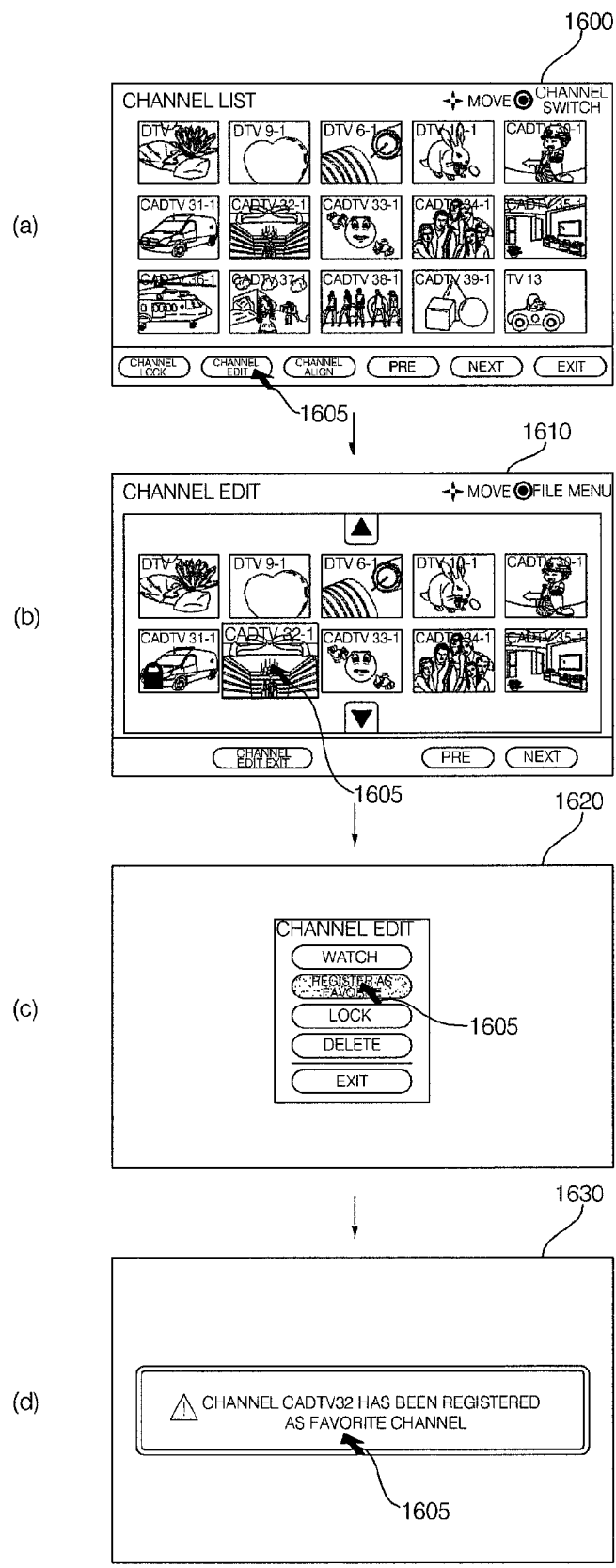
FIGS. 16 to 18 are diagrams explaining how a channel-edit function may be performed when a channel list is displayed.
Figure 17:
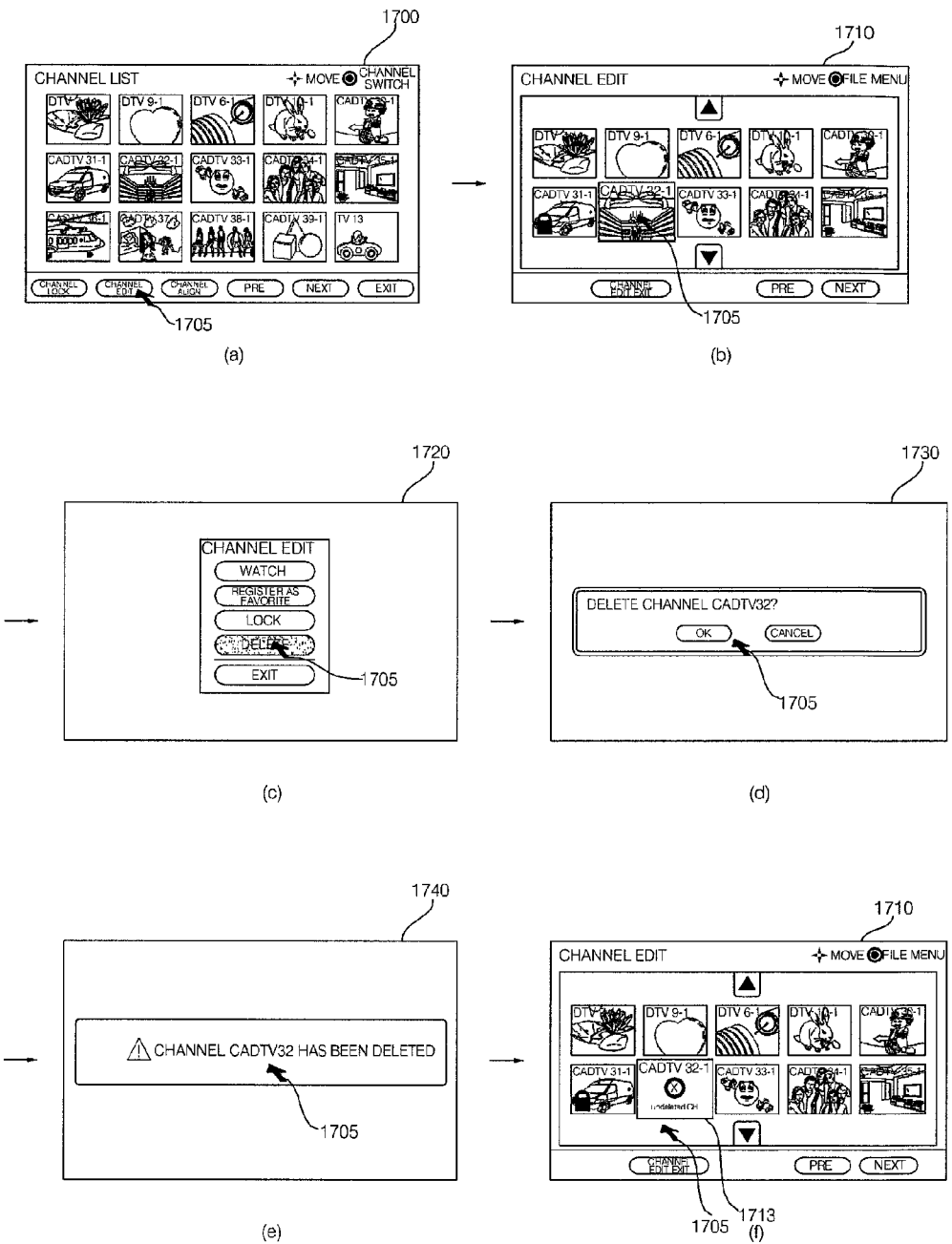
Figure 18:
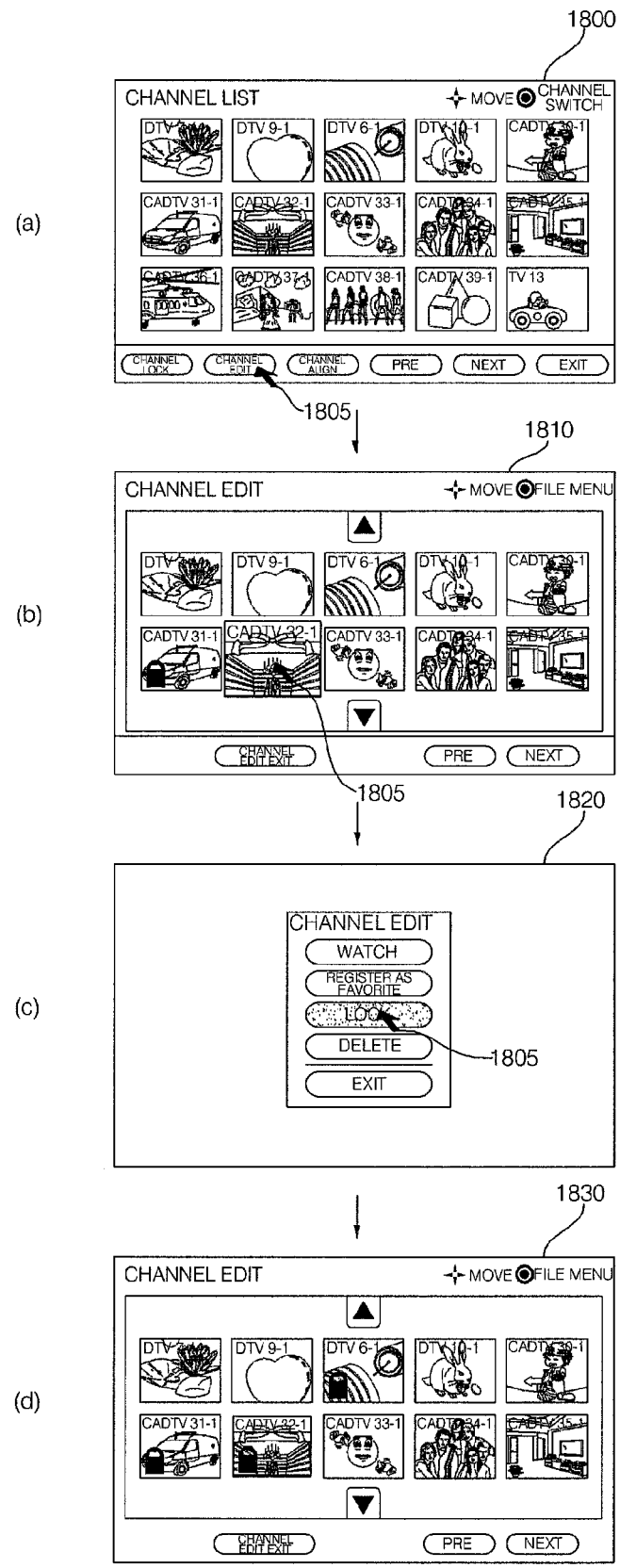

FIGS. 16 through 18 illustrate diagrams for explaining how to perform a channel-edit function when a channel list is displayed.

Referring to FIG. 16(a), a thumbnail-image list (or screen) 1600 including a plurality of thumbnail images respectively corresponding to a plurality of broadcast image signals received from various channels may be displayed in a full-view mode on the entire display 180. Then, if a 'channel edit' menu is selected from the thumbnail-image list 1600 by being pointed at by a pointer 1605, as shown in FIG. 16(a), a 'channel edit' screen 1610 for editing the thumbnail images displayed in the thumbnail-image list 1600 may be displayed on the display 180, as shown in FIG. 16(b).

If one of the thumbnail images displayed in the 'channel edit' screen 1610 is selected by being pointed at by a pointer 1605, as shown in FIG. 16(b), a 'channel edit' screen 1620 showing a plurality of menu items of the 'channel edit' menu, i.e., a 'watch' item, a 'register as favorite channel' item, a 'lock' item and a 'delete' item, may be displayed, as shown in FIG. 16(c). If the 'register as favorite channel' item is selected by being pointed at by the pointer 1605, as shown in FIG. 16(c), a 'register as favorite channel' screen 1630 may be displayed on the display 180, as shown in FIG. 16(d).

The 'channel edit' menu and the 'register as favorite channel' item are illustrated in FIG. 16 as being selected by the pointer 1605. Variations are possible. For example, the 'channel edit' menu and the 'register as favorite channel' item may be selected by a cursor.

Alternatively, referring to FIGS. 17(a) through 17(e), if a 'delete' item is selected from a 'channel edit' screen 1720 by being pointed at by a pointer 1705 when one of when a plurality of thumbnail images displayed in a 'channel edit' screen 1710 is selected, a channel delete-warning screen 1730 asking a confirmation or denial whether the user wishes to delete a channel represented by the selected thumbnail image may be displayed, as shown in FIG. 17(d). If an 'OK' item is selected from the channel delete-warning screen 1720 by being pointing at by the pointer 1705, as shown in FIG. 17(d), a channel delete-confirmation screen 1740 confirming that the channel represented by the selected thumbnail image has been deleted may be displayed on the display 180, as shown in FIG. 17(e).

The 'delete' item and the 'OK' item are illustrated in FIG. 17 as being selected by the pointer 1705, but the present invention is not restricted to this. That is, the 'delete' item and the 'OK' item may be selected by a cursor.

Referring to FIG. 17(f), a thumbnail image 1713 corresponding to a deleted channel may still be displayed in the 'channel edit' screen 1710. The thumbnail image 1713 may be displayed differently from other thumbnail images in the 'channel edit' screen 1710 in terms of at least one of brightness, contrast, fade and transparency. Thus, the user may easily identify that the thumbnail image 1713 corresponds to a deleted channel.

Still alternatively, referring to FIGS. 18(a) through 18(d), if a 'lock' item is selected from a 'channel edit' screen 1820 by being pointed at by a pointer 1805 when one of when a plurality of thumbnail images displayed in a 'channel edit' screen 1810 is selected, a 'channel edit' screen 1830 showing the selected thumbnail image as being locked may be displayed on the display 180, as shown in FIG. 18(d).

Figure 19:
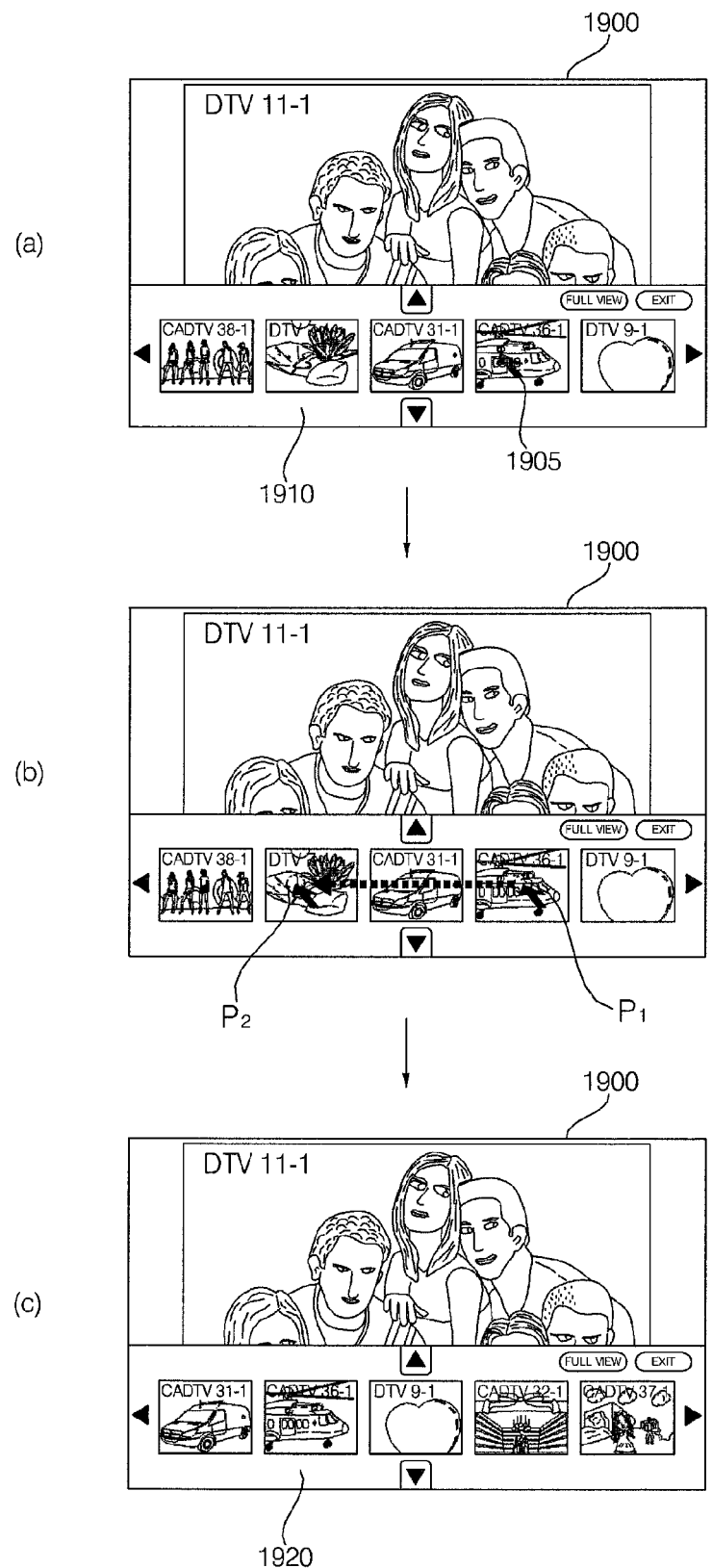
FIGS. 19 and 20 are diagrams explaining how a thumbnail-image list (or screen) may be scrolled when a channel list is displayed.
Figure 20:
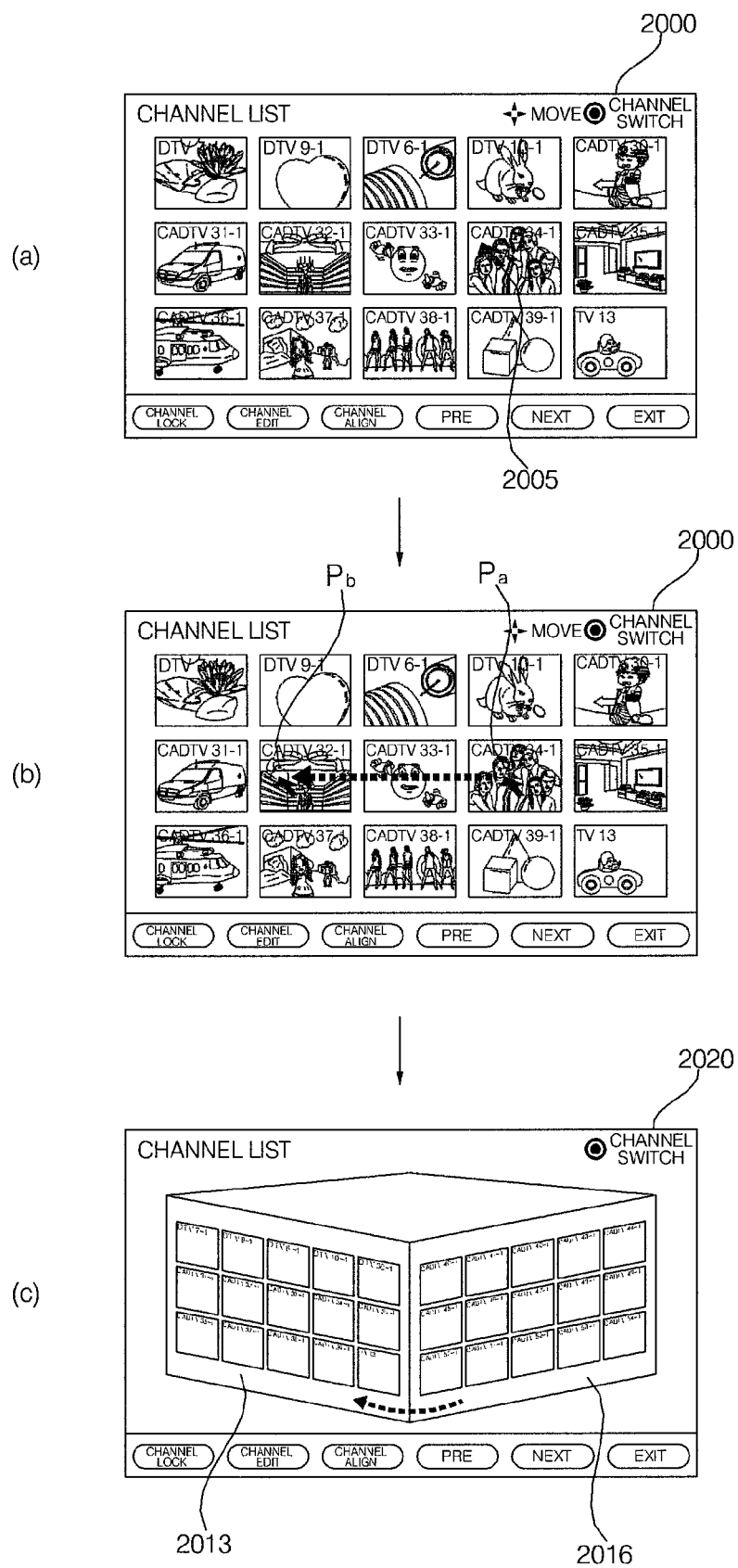

FIGS. 19 and 20 explain how a thumbnail-image list may be scrolled when a channel list is displayed.

Referring to FIG. 19(a), a screen 1900 may be displayed on an upper part of the display 180, and a thumbnail-image list (or screen) 1910 including a plurality of thumbnail images respectively corresponding to a plurality of broadcast image signals received from various channels may be displayed in a compact-view mode on a lower part of the display 180. Then, if a pointer 1905 is dragged from a point P1 to a point P2, as shown in FIG. 19(b), the thumbnail-image list 1910 may be scrolled accordingly so that a new thumbnail-image list 1920 can be displayed on the display 180, as shown in FIG. 19(c).

In this manner, it is possible to efficiently display even a large number of thumbnail images on the display 180.

Referring to FIGS. 20(a) and 20(b), if a pointer 2005 is dragged from a point Pa to a point Pb when a thumbnail-image list 2000 including a plurality of thumbnail images respectively corresponding to a plurality of broadcast image signals received from various channels is displayed in a full-view mode on the entire display 180, a screen 2020 showing both the thumbnail images included in the thumbnail-image list 2000 and a plurality of thumbnail images included in a next thumbnail-image list to the thumbnail-image list 2000 may be displayed on the display 180, as shown in FIG. 20(c).

More specifically, the screen 200 may include a first area 2013 in which the thumbnail images included in the thumbnail-image list 2000 are displayed and a second area 2016 in which the thumbnail images included in the next thumbnail-image list are displayed. In this manner, it is possible to efficiently display even a large number of thumbnail images on the display 180.

A mobile terminal formed to operate in accordance with one of the aforementioned embodiments are not restricted to the exemplary embodiments set forth herein. Therefore, variations and combinations of the exemplary embodiments set forth herein may fall within the scope of the present invention.

Another embodiment may be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the internet).

The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

In accordance with one or more of the aforementioned embodiments, an image display apparatus and an operating method of the image display apparatus is provided which can help a user intuitively identify various images input to the image display apparatus. According to an aspect, there is provided an operating method of an image display apparatus, the operating method including displaying a screen on a display; and in response to a command to display an input image, displaying a thumbnail-image list including a plurality of thumbnail images respectively corresponding to a plurality of input image signals on the display.

According to another aspect, there is provided an image display apparatus including a display displaying a screen; an external signal input unit receiving signals from an external input device; and a controller controlling a thumbnail-image list including a plurality of thumbnail images respectively corresponding to a plurality of external input image signals provided by the external input device to be displayed on the display in response to a command to display an external input image list.

According to another aspect, there is provided an image display apparatus including a display displaying a selected screen; a storage unit storing at least one or more previously-added channels; a tuner receiving a number of first broadcast image signals from one or more selected channels or a plurality of second broadcast image signals from the previously-added channels; and a controller controlling a thumbnail-image list including a plurality of thumbnail images respectively corresponding to the plurality of second broadcast image signals to be displayed on the display in response to a command to display a channel list.

According to another aspect of the present invention, there is provided an image display apparatus including a display displaying a selected screen; a storage unit storing at least one or more previously-added channels; a first tuner receiving a number of first broadcast image signals from one or more selected channels; a second tuner receiving a plurality of second broadcast image signals from the previously-added channels; and a controller controlling a thumbnail-image list including a plurality of thumbnail images respectively corresponding to the plurality of second broadcast image signals to be displayed on the display in response to a command to display a channel list.

According to these and other embodiments, it is possible to display a thumbnail-image list including a plurality of thumbnail images respectively corresponding to a plurality of input image signals such as broadcast image signals received from various channels or external input image signals provided by an external input device and thus to allow a user to intuitively recognize the input image signals based on the thumbnail-image list.

In addition, it is possible to allow a user to easily identify an external input device, if any, connected to an image display apparatus.

Moreover, it is possible to allow a user to utilize various user interfaces even when a thumbnail-image list is displayed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An operating method of an image display apparatus, comprising:
   receiving a first input signal;
   displaying a first image on a display based on the first input signal;
   receiving a second input signal;
   generating a plurality of thumbnail images which includes a thumbnail image of a second image, the thumbnail image of the second image generated based on the second input signal;
   displaying a first thumbnail-image list including the plurality of thumbnail images including the thumbnail image of the second image, wherein the first thumbnail-image list is displayed in response to a command signal received during a time when the first image is displayed, the first thumbnail-image list further including a first object indicating a full-view mode;
   displaying a second thumbnail-image list comprising a plurality of thumbnail images in response to selection of the first object, wherein the second thumbnail-image list further comprises a second object related to a recently-viewed channels item; and
   displaying a third thumbnail-image list comprising a plurality of thumbnail images corresponding to recently viewed channels in response to selection of the second object,
   wherein the second object is a channel align item for aligning the plurality of thumbnail images, the method further comprising:
   displaying a channel align screen including the recently-viewed channels in response to selection of the channel align item, wherein the third thumbnail-image list is displayed according to the recently-viewed channels item.

2. The method of claim 1, wherein the plurality of thumbnail images are generated by:
   (1) forming the second image based on the second input signal;
   (2) forming a thumbnail image corresponding to the second image formed in (1); and
   (3) repeating (1) and (2) one or more times for additional images to generate a corresponding number of additional ones of the plurality of thumbnail images.

3. The method of claim 1, wherein the plurality of thumbnail images are generated by:
   (1) decoding the second image from the second input signal;
   (2) converting a format of the decoded second image;
   (3) encoding the second image in the converted format to generate a corresponding thumbnail image; and
   (4) repeating (1) to (3) one or more times for additional images to generate a corresponding number of additional ones of the thumbnail images.

4. The method of claim 1, wherein the first input signal and the second input signal are received through different channels or from different sources.

5. The method of claim 1, further comprising:
   updating at least one of the thumbnail images, and
   displaying the updated thumbnail image in the first thumbnail-image list.

6. The method of claim 1, wherein displaying the first thumbnail-image list comprises:
   displaying source information corresponding to each thumbnail image in the list,
   wherein the source information corresponding to each thumbnail image in the list is different.

7. The method of claim 1, wherein a size of the first image is greater than a size of the thumbnail image corresponding to the first image.

8. The method of claim 1, wherein a size of one or more of the thumbnail images displayed in the second thumbnail-image list is different from a size of one or more thumbnail images displayed in the first thumbnail-image list.

9. The method of claim 1, wherein a screen including the thumbnail-images in the first thumbnail-image list includes one or more thumbnail images corresponding to a number of previously-deleted input image signals, and wherein the first thumbnail-image list is displayed by changing at least one of brightness, contrast, fade, or transparency of the thumbnail images corresponding to previously-deleted image signals so that the corresponding thumbnail images are distinguished from other ones of the thumbnail images in the list.

10. The method of claim 1, wherein the second input signal is received before the first image is displayed.

11. An image display apparatus, comprising:
   a display to display at least one image;
   an input configured to receive first and second input signals; and
   a controller to control the display to display a first image based on the first input signal and to display a first thumbnail-image list including thumbnail images of the first image and a second image generated based on the second input signal, wherein the first thumbnail-image list is displayed in response to a command signal received during a time when the first image is displayed, and the first thumbnail image list displays a first object indicating a full-view mode displaying a second thumbnail image list on the entire display, wherein the controller controls the display to display a second thumbnail-image list comprising a plurality of thumbnail images in response to selection of the first object, wherein the second thumbnail-image list displays a second object related to a recently-viewed channels item, wherein the controller controls the display to display a third thumbnail-image list comprising a plurality of thumbnail images corresponding to recently-viewed channels in response to selection of the second object, wherein the second object is a channel align item for aligning the plurality of thumbnail images, and wherein the controller further controls the display to display a channel align screen including the recently-viewed channels in response to selection of the channel align item, wherein the third thumbnail-image list is displayed according to the recently-viewed channels item.

12. The apparatus of claim 11, further comprising:
a channel-browsing processor to extract the thumbnail images in the first thumbnail-image list in response to the command signal received from an external device.

13. The apparatus of claim 11, wherein the second input signal is received before the first image is displayed.

* * * * *